United States Patent
Tanaka et al.

(10) Patent No.: US 11,958,922 B2
(45) Date of Patent: Apr. 16, 2024

(54) VINYL-BASED RESIN PARTICLES AND METHOD FOR PRODUCING SAME

(71) Applicant: SEKISUI PLASTICS CO., LTD., Osaka (JP)

(72) Inventors: Kohei Tanaka, Osaka (JP); Kengo Nishiumi, Osaka (JP); Ryosuke Harada, Osaka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 546 days.

(21) Appl. No.: 17/274,537

(22) PCT Filed: Aug. 28, 2019

(86) PCT No.: PCT/JP2019/033674
§ 371 (c)(1),
(2) Date: Mar. 9, 2021

(87) PCT Pub. No.: WO2020/054416
PCT Pub. Date: Mar. 19, 2020

(65) Prior Publication Data
US 2021/0347923 A1 Nov. 11, 2021

(30) Foreign Application Priority Data
Sep. 11, 2018 (JP) ................. 2018-169795

(51) Int. Cl.
*C08F 220/18* (2006.01)
*C08F 212/08* (2006.01)
(Continued)

(52) U.S. Cl.
CPC ...... *C08F 220/1804* (2020.02); *C08F 220/14* (2013.01); *C08J 3/12* (2013.01); *C08J 2333/10* (2013.01); *C08J 2333/12* (2013.01)

(58) Field of Classification Search
None
See application file for complete search history.

(56) References Cited

U.S. PATENT DOCUMENTS 9,499,713 B2 11/2016 Teramoto
9,814,656 B2 11/2017 Hama et al.
(Continued)

FOREIGN PATENT DOCUMENTS

JP 10-316795 12/1998
JP 2001-210142 8/2001
(Continued)

OTHER PUBLICATIONS

Office Action dated Jun. 14, 2022 in corresponding Japanese Patent Application No. 2020-546836, with machine translation.
(Continued)

*Primary Examiner* — Richard A Huhn
(74) *Attorney, Agent, or Firm* — Wenderoth, Lind & Ponack, L.L.P.

(57) ABSTRACT

The present invention provides vinyl-based resin particles capable of easily smoothing the surface of a thermosetting resin film when the particles are used as a pore-forming material for a thermosetting resin. Specifically, the present invention provides vinyl-based resin particles for use in making a thermosetting resin porous, the particles having a temperature of 230° C. or higher and lower than 300° C. at 10% mass loss when heated at a rate of 10° C./min in an air atmosphere, and the particles having a mass loss percentage of 85 to 100% after being heated at 350° C. for 5 hours in an air atmosphere.

14 Claims, 1 Drawing Sheet

(51) Int. Cl.
  *C08F 212/36* (2006.01)
  *C08F 220/14* (2006.01)
  *C08F 222/10* (2006.01)
  *C08J 3/12* (2006.01)

(56) References Cited

U.S. PATENT DOCUMENTS

| | | | |
|---|---|---|---|
| 2006/0069171 | A1 | 3/2006 | Prokopowicz et al. |
| 2014/0329130 | A1 | 11/2014 | Kanamura et al. |
| 2015/0005437 | A1 | 1/2015 | Teramoto |
| 2015/0030842 | A1 | 1/2015 | Hama et al. |
| 2018/0267315 | A1* | 9/2018 | Yonemura ............... G02B 1/041 |
| 2020/0399413 | A1* | 12/2020 | Nishiumi ................... C08J 9/26 |

FOREIGN PATENT DOCUMENTS

| | | | | |
|---|---|---|---|---|
| JP | 2001210142 A * | 8/2001 | ................ C08J 9/26 | |
| JP | 2002-037912 | 2/2002 | | |
| JP | 2006-77245 | 3/2006 | | |
| JP | 2010-24385 | 2/2010 | | |
| JP | 2010-138365 | 6/2010 | | |
| JP | 2012-207197 | 10/2012 | | |
| JP | 2014-198785 | 10/2014 | | |
| JP | 2016-183273 | 10/2016 | | |
| WO | 2013/030977 | 3/2013 | | |
| WO | 2013/084368 | 6/2013 | | |
| WO | 2014/050177 | 4/2014 | | |
| WO | 2014/196435 | 12/2014 | | |
| WO | WO-2022131052 A1 * | 6/2022 | ........ C08F 220/1804 | |

OTHER PUBLICATIONS

International Search Report dated Oct. 8, 2019 in International (PCT) Application No. PCT/JP2019/033674.

* cited by examiner

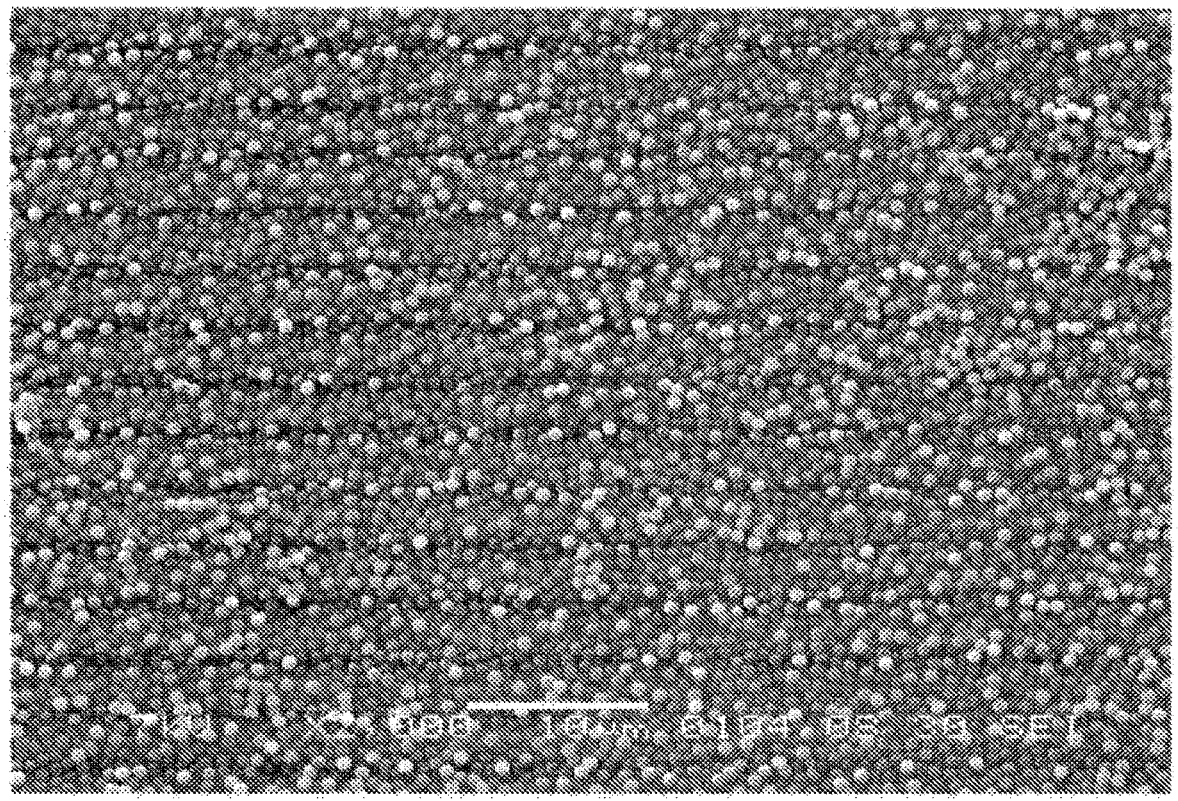

VINYL-BASED RESIN PARTICLES AND METHOD FOR PRODUCING SAME

TECHNICAL FIELD

The present invention relates to vinyl-based resin particles, and a method for producing the vinyl-based resin particles.

BACKGROUND ART

Polyimide resins are used as a heat-resistant material or an insulating material for electronic components because of their excellent heat resistance, mechanical strength, electrical characteristics, chemical resistance, molding characteristics, and other characteristics.

Polyimide resins used as an insulating material for electronic components are required to have improved electrical characteristics, while maintaining heat resistance and mechanical strength. In particular, to suppress the attenuation of high-frequency currents of electronic components, such polyimide resins are required to have a reduced dielectric constant.

For example, a known low-dielectric polyimide resin is a porous polyimide in which the dielectric constant is reduced by increasing the porosity of a polyimide resin.

Forming large pores in a porous polyimide readily increases the porosity; but, on the other hand, also reduces the heat resistance and mechanical strength. It is thus necessary to increase the porosity by dispersing pores that are as small as possible, at high density.

For example, PTL 1 discloses a method for producing a porous polyimide film, comprising applying a polyimide precursor slurry containing uniformly dispersed silica particles to at least one surface of a substrate, subjecting the slurry to a cyclodehydration reaction for polyimidization to form a 5- to 20-μm-thick silica-polyimide film containing three-dimensionally ordered silica particles, and removing the silica particles from the silica-polyimide film.

PTL 2 discloses a porous polyimide film comprising forming a coating film that contains an aqueous solution of polyimide precursor prepared by dissolving a polyimide precursor in a water-soluble solvent, and that contains non-crosslinking resin particles incapable of dissolving in the solution; then drying and heating the coating film to imidize it to form a polyimide film; and removing the non-crosslinking resin particles by dissolving the particles in an organic solvent to form pores.

PTL 3 discloses a method for producing a porous polyimide film, comprising a firing step of firing an unfired composite film containing polyamic acid or polyimide, fine resin particles, and a condensing agent at a temperature lower than the decomposition temperature of the fine resin particles to form a polyimide-fine resin particle composite film; and a fine particle removing step of removing the fine resin particles from the polyimide-fine resin particle composite film.

CITATION LIST

Patent Literature

PTL 1: WO2013/084368A
PTL 2: JP2016-183273A
PTL 3: WO2014/196435A

SUMMARY OF INVENTION

Technical Problem

PTL 1 discloses bringing the substrate on which the silica-polyimide film is formed into contact with hydrofluoric acid (HF) to remove the silica particles. However, hydrofluoric acid is difficult to handle due to its toxicity, corrosiveness, and explosion risk during reaction; and requires a special device for controlling the hydrofluoric acid, as well as a costly waste-liquid treatment. Thus, a method for producing a porous polyimide film without using hydrofluoric acid is desired.

PTL 2 uses non-crosslinking resin particles as an alternative for silica particles to enable the removal of particles by using an organic solvent, without using hydrofluoric acid. However, due to the step of removing particles by using a solvent, this process requires a higher production cost than the process of removing particles in the firing step.

The Examples of PTL 3 disclose that a porous polyimide film having good film strength was obtained by adding a condensing agent without using hydrofluoric acid, even when heat treatment was performed at a temperature as low as 230° C. However, due to the use of N,N-dimethylacetamide as a solvent in the Examples of PTL 3, non-crosslinked polymethyl-methacrylate-resin particles undergo solvent swelling, which increases the viscosity of the varnish. Thus, the coatability of the varnish becomes poor, and the surface of the polyimide film cannot be sufficiently smoothed.

An object of the present invention is to provide vinyl-based resin particles capable of smoothing the surface of a thermosetting resin film in a simple manner, and a method for producing the vinyl-based resin particles.

Solution to Problem

As a result of extensive research to achieve the above object, the present inventors succeeded in developing vinyl-based resin particles exhibiting specific thermal decomposition behavior in an air atmosphere, and found that the object can be achieved by using the vinyl-based resin particles. The inventors conducted further research, and accomplished the present invention.

Specifically, the present invention provides the invention according to the following embodiments.

Item 1.

Vinyl-based resin particles for use in making a thermosetting resin porous, the particles having a temperature of 230° C. or higher and lower than 300° C. at 10% mass loss when heated at a rate of 10° C./min in an air atmosphere, and the particles having a mass loss percentage of 85 to 100% after being heated at 350° C. for 5 hours in an air atmosphere.

Item 2.

The vinyl-based resin particles according to Item 1, wherein the vinyl-based resin particles have a number average particle diameter in the range of 0.1 to 3 μm.

Item 3.

The vinyl-based resin particles according to Item 2, wherein the coefficient of variation of the number average particle diameter is 25% or less.

Item 4.

The vinyl-based resin particles according to any one of Items 1 to 3, wherein the proportion of the number of particles having a particle diameter that is 2 to 10 times the median diameter (D50) on a number basis is in the range of 0 to 5%.

Item 5.

The vinyl-based resin particles according to any one of Items 1 to 4, wherein the vinyl-based resin particles are formed of a polymer having a polymerizable vinylic monomer unit composed of a monofunctional monomer unit and a polyfunctional monomer unit, and the polymerizable vinylic monomer unit comprises the polyfunctional monomer unit in an amount of 8 to 150 parts by mass based on 100 parts by mass of the monofunctional monomer unit.

Item 6.

The vinyl-based resin particles according to Item 5, wherein the monofunctional monomer unit is at least one member selected from the group consisting of a monofunctional styrenic monomer unit and a monofunctional (meth) acrylic monomer unit, and the polyfunctional monomer unit is at least one member selected from the group consisting of a polyfunctional styrenic monomer unit and a polyfunctional (meth)acrylic monomer unit.

Item 7.

The vinyl-based resin particles according to Item 6, wherein the monofunctional (meth)acrylic monomer unit is a (meth)acrylic acid alkyl ester monomer unit, and an alkyl group having 1 to 10 carbon atoms is bonded to the ester.

Item 8.

The vinyl-based resin particles according to any one of Items 1 to 7, wherein a pH of 3 to 9 is obtained when the vinyl-based resin particles are dispersed in water so that the mass ratio of the vinyl-based resin particles to water is 1:10.

Item 9.

The vinyl-based resin particles according to any one of Items 1 to 8, which have an Rsp value of 5 or more and 150 or less, wherein the Rsp value is represented by the following formula (1):

$$Rsp=(Rav-Rb)/Rb \qquad (1)$$

Rav: Reciprocal of average value of transverse relaxation time $T_2$ (ms) obtained by the following measurement method 1

Rb: Reciprocal of transverse relaxation time $T_2$ (ms) obtained by the following measurement method 2

Measurement Method 1

A vinyl-based resin particle dispersion is obtained by mixing the vinyl-based resin particles and a first organic solvent in a mass ratio of 1:3, a polyimide precursor varnish is obtained by mixing the vinyl-based resin particle dispersion, a polyimide precursor solution with a solid concentration of 18±1 mass %, and a second organic solvent in a mass ratio of 6:3.61:1.8, the transverse relaxation time $T_2$ (ms) of protons derived from the varnish is measured three times by the CPMG method using a hydrogen nucleus as a measurement nucleus at a measurement temperature of 20° C. at a resonance frequency of 13 MHz with a 90° pulse width of 5.81 μs to calculate an average value thereof, and the reciprocal of the average value is taken as Rav.

Measurement Method 2

A blank solution is obtained by mixing the first organic solvent, a polyimide precursor solution with a solid concentration of 18±1 mass %, and the second organic solvent in a mass ratio of 4.5:3.61:1.8, the transverse relaxation time $T_2$ (ms) of protons derived from the blank solution is measured three times by the CPMG method using a hydrogen nucleus as a measurement nucleus at a measurement temperature of 20° C. at a resonance frequency of 13 MHz with a 90° pulse width of 5.81 μs to calculate an average value thereof, and the reciprocal of the average value is taken as Rb.

Item 10.

A method for producing the vinyl-based resin particles according to any one of Items 1 to 9, the method comprising:
a seed polymerization step of performing seed polymerization by absorbing a first polymerizable vinylic monomer into seed particles to obtain an aqueous dispersion containing polymer particles of the first polymerizable vinylic monomer and an aqueous medium;
a spray-drying step of spray-drying the aqueous dispersion obtained in the seed polymerization step at an inlet temperature of 80 to 220° C. and an outlet temperature of 50 to 100° C. to obtain an aggregate; and
a crushing step of crushing the aggregate obtained in the spray-drying step to obtain vinyl-based resin particles,
wherein in the seed polymerization step, the first polymerizable vinylic monomer comprises a monofunctional monomer and a polyfunctional monomer, and the first polymerizable vinylic monomer comprises the polyfunctional monomer in an amount of 8 to 150 parts by mass based on 100 parts by mass of the monofunctional monomer.

Item 11.

The method for producing the vinyl-based resin particles according to Item 10, comprising at least one of a first classification step of classifying the polymer particles obtained in the seed polymerization step and a second classification step of classifying the vinyl-based resin particles obtained in the crushing step.

Item 12.

A method for producing the vinyl-based resin particles according to any one of Items 1 to 9, the method comprising:
an emulsion polymerization step of emulsion-polymerizing a second polymerizable vinylic monomer in an aqueous medium to obtain an aqueous dispersion containing polymer particles of the second polymerizable vinylic monomer and the aqueous medium;
a spray-drying step of spray-drying the aqueous dispersion obtained in the emulsion polymerization step at an inlet temperature of 80 to 220° C. and an outlet temperature of 50 to 100° C. to obtain an aggregate; and
a crushing step of crushing the aggregate obtained in the spray-drying step to obtain vinyl-based resin particles.

Item 13.

The method for producing the vinyl-based resin particles according to Item 12, comprising a pH adjustment step of adding a nitrogen-containing compound to the aqueous dispersion obtained in the emulsion polymerization step to adjust the pH of the aqueous dispersion to 3 to 9.

Item 14.

The method for producing the vinyl-based resin particles according to Item 12 or 13, comprising at least one of a first classification step of classifying the polymer particles obtained in the emulsion polymerization step and a second classification step of classifying the vinyl-based resin particles obtained in the crushing step.

Advantageous Effects of Invention

The vinyl-based resin particles according to the present invention used as a pore-forming material for a thermosetting resin easily smooth the surface of a thermosetting resin film. The vinyl-based resin particles according to the present invention smooth the surface of a thermosetting resin film in a simple manner without requiring hydrofluoric acid, unlike the conventional techniques.

BRIEF DESCRIPTION OF DRAWINGS

FIG. 1 is a scanning electron microscope (SEM) photograph of the vinyl-based resin particles obtained in Example 1.

DESCRIPTION OF EMBODIMENTS

Preferred embodiments of the present invention are described in detail below.

In the present specification, "(meth)acrylic" means acrylic or methacrylic, and "(meth)acrylate" means acrylate or methacrylate.

In the present specification, the phrase "monofunctional styrenic monomer unit" refers to a repeating structural unit formed when a monofunctional styrenic monomer is polymerized, and does not refer to the monomer itself. Similarly, the phrase "monofunctional (meth)acrylic monomer unit" refers to a repeating structural unit formed when a monofunctional (meth)acrylic monomer is polymerized, and does not refer to the monomer itself.

In the present specification, the phrase "polyfunctional styrenic monomer unit" refers to a repeating structural unit formed when a polyfunctional styrenic monomer is polymerized, and does not refer to the monomer itself. Similarly, the phrase "polyfunctional (meth)acrylic monomer unit" refers to a repeating structural unit formed when a polyfunctional (meth)acrylic monomer is polymerized, and does not refer to the monomer itself.

In the present specification, the pH of vinyl-based resin particles means the pH of a dispersion obtained by dispersing the vinyl-based resin particles in water so that the mass ratio of the vinyl-based resin particles to water is 1:10 (dispersion of the vinyl-based resin particles) measured at room temperature (20 to 25° C.) with a pH meter.

1. Vinyl-Based Resin Particles

The vinyl-based resin particles of the present invention have the characteristics that the particles have a temperature of 230° C. or higher and lower than 300° C. at 10% mass loss when heated at a rate of 10° C./min in an air atmosphere, and that the particles have a mass loss percentage of 85 to 100% after being heated at 350° C. for 5 hours in an air atmosphere.

Since the vinyl-based resin particles of the present invention have the above characteristics, the particles are suitably used for making a thermosetting resin porous. Specifically, the vinyl-based resin particles of the present invention, which have the above characteristics, are capable of easily smoothing the surface of a thermosetting resin film when used as a pore-forming material for a thermosetting resin.

Thermal Decomposition Behavior

The temperature of the vinyl-based resin particles of the present invention at 10% mass loss (10% thermal decomposition temperature) when the particles are heated from 40° C. to 500° C. at a heating rate of 10° C./min in an air atmosphere using a thermogravimetric-differential thermal analyzer (also referred to below as a "TGA apparatus") is 230° C. or higher and lower than 300° C., and the mass loss percentage of the particles when the particles are heated at 350° C. for 5 hours after they are heated from 40° C. to 350° C. at a heating rate of 10° C./min in an air atmosphere is 85 to 100%.

In the present specification, the 10% thermal decomposition temperature means the temperature at which the mass loss percentage of a sample is 10 mass % when the sample is heated at a heating rate of 10° C./min in an air atmosphere using a TGA apparatus. As the TGA apparatus, for example, a TG/DTA6200 (produced by SII NanoTechnology Inc.) can be used. The mass of the vinyl-based resin particles of the present invention used as the sample here is about 15 mg.

In the present specification, the mass loss percentage after heating at 350° C. for 5 hours in an air atmosphere can be calculated from the following equation: [(mass of sample before heating-mass of sample after heating)/mass of sample before heating]×100. The mass loss percentage after heating at 350° C. for 5 hours can be measured using a TGA apparatus.

If the 10% thermal decomposition temperature is 300° C. or higher, the viscosity of a thermosetting resin precursor solution in which the vinyl-based resin particles are dispersed may increase. Therefore, excellent coatability of the thermosetting resin precursor solution cannot be obtained, and it may thus be difficult to smooth the surface of a thermosetting resin film when the film is produced.

If the 10% thermal decomposition temperature is lower than 230° C., the vinyl-based resin particles added may be decomposed before the thermosetting resin is cured. The vinyl-based resin particles thus do not remain in the thermosetting resin, which may make it difficult to make a thermosetting resin film porous when the film is produced.

In terms of more suitably using the vinyl-based resin particles of the present invention for making a thermosetting resin porous, the vinyl-based resin particles of the present invention preferably have the characteristics that the temperature at 10% mass loss when the particles are heated from 40° C. to 500° C. at a heating rate of 10° C./min in an air atmosphere is 240 to 296° C. and that the mass loss percentage when the particles are heated at 350° C. for 5 hours after they are heated at a heating rate of 10° C./min in an air atmosphere is 88 to 100%.

In terms of even more suitably using the vinyl-based resin particles of the present invention for making a thermosetting resin porous, the vinyl-based resin particles of the present invention more preferably have the characteristics that the temperature at 10% mass loss when the particles are heated from 40° C. to 500° C. at a heating rate of 10° C./min in an air atmosphere is 250 to 294° C. and that the mass loss percentage when the particles are heated at 350° C. for 5 hours after they are heated at a heating rate of 10° C./min in an air atmosphere is 90 to 100%.

In terms of particularly suitably using the vinyl-based resin particles of the present invention for making a thermosetting resin porous, the vinyl-based resin particles of the present invention even more preferably have the characteristics that the temperature at 10% mass loss when the particles are heated from 40° C. to 500° C. at a heating rate of 10° C./min in an air atmosphere is 255 to 292° C. and that the mass loss percentage when the particles are heated at 350° C. for 5 hours after they are heated at a heating rate of 10° C./min in an air atmosphere is 92 to 100%.

Number Average Particle Diameter

The vinyl-based resin particles of the present invention preferably have a number average particle diameter of 0.15 to 1.5 µm. A number average particle diameter within this range improves the mechanical strength and heat-insulating properties of a porous thermosetting resin film famed using the vinyl-based resin particles of the present invention.

The vinyl-based resin particles of the present invention more preferably have a number average particle diameter of 0.2 to 1.2 μm. A number average particle diameter within this range further improves the mechanical strength and heat-insulating properties of a porous thermosetting resin film formed using the vinyl-based resin particles of the present invention.

The vinyl-based resin particles of the present invention even more preferably have a number average particle diameter of 0.3 to 1.0 μm. A number average particle diameter within this range even further improves the mechanical strength and heat-insulating properties of a porous thermosetting resin film formed using the vinyl-based resin particles of the present invention.

Coefficient of Variation of Number Average Particle Diameter

In the vinyl-based resin particles of the present invention, the coefficient of variation of the number average particle diameter is preferably 25% or less. A coefficient of variation of the number average particle diameter within this range improves the mechanical strength of a porous thermosetting resin film formed using the vinyl-based resin particles of the present invention.

In the vinyl-based resin particles of the present invention, the coefficient of variation of the number average particle diameter is more preferably 20% or less. A coefficient of variation of the number average particle diameter within this range further improves the mechanical strength of a porous thermosetting resin film formed using the vinyl-based resin particles of the present invention.

In the vinyl-based resin particles of the present invention, the coefficient of variation of the number average particle diameter is even more preferably 15% or less. A coefficient of variation of the number average particle diameter within this range even further improves the mechanical strength of a porous thermosetting resin film formed using the vinyl-based resin particles of the present invention.

Proportion of Coarse Particles

In the present specification, the proportion of coarse particles means the proportion of the number of particles having a particle diameter that is 2 to 10 times the median diameter (D50) on a number basis with respect to the total number of the vinyl-based resin particles of the present invention.

In the vinyl-based resin particles of the present invention, the proportion of coarse particles is preferably 0 to 5%. When a porous thermosetting resin film is formed using the vinyl-based resin particles of the present invention in which the proportion of coarse particles is within the above range, variations in the diameter of the pores formed in the porous thermosetting resin film are reduced, which improves the mechanical strength of the porous thermosetting resin film.

In the vinyl-based resin particles of the present invention, the proportion of coarse particles is more preferably 0 to 3%. When a porous thermosetting resin film is formed using the vinyl-based resin particles of the present invention in which the proportion of coarse particles is within the above range, variations in the diameter of the pores formed in the porous thermosetting resin film are further reduced, which further improves the mechanical strength of the porous thermosetting resin film.

In the vinyl-based resin particles of the present invention, the proportion of coarse particles is even more preferably 0 to 1%. When a porous thermosetting resin film is formed using the vinyl-based resin particles of the present invention in which the proportion of coarse particles is within the above range, variations in the diameter of the pores famed in the porous thermosetting resin film are even further reduced, which even further improves the mechanical strength of the porous thermosetting resin film.

Types of Monofunctional Monomer and Polyfunctional Monomer

The vinyl-based resin particles of the present invention are preferably formed of a polymer having a polymerizable vinylic monomer unit composed of a monofunctional monomer unit and a polyfunctional monomer unit. In particular, the polymerizable vinylic monomer unit preferably comprises the polyfunctional monomer unit in an amount of 8 to 150 parts by mass based on 100 parts by mass of the monofunctional monomer unit.

In the present invention, the polymerizable vinylic monomer unit more preferably comprises the polyfunctional monomer unit in an amount of 12 to 100 parts by mass, and even more preferably 18 to 80 parts by mass, based on 100 parts by mass of the monofunctional monomer unit, in terms of improving the mechanical strength of a porous thermosetting resin film.

In the present invention, it is preferable that the monofunctional monomer unit is at least one member selected from the group consisting of a monofunctional styrenic monomer unit and a monofunctional (meth)acrylic monomer unit, and that the polyfunctional monomer unit is at least one member selected from the group consisting of a polyfunctional styrenic monomer unit and a polyfunctional (meth)acrylic monomer unit.

Examples of monofunctional styrenic monomers include styrene, o-methylstyrene, m-methylstyrene, p-methylstyrene, α-methylstyrene; styrene sulfonic acid salts, such as sodium styrene sulfonate and ammonium styrene sulfonate; and the like. Of these, styrene, α-methylstyrene, and sodium styrene sulfonate are preferable. These monofunctional styrenic monomers may be used singly or as a mixture of two or more.

Examples of monofunctional (meth)acrylic monomers include (meth)acrylic acid alkyl esters to which an alkyl group having 1 to 20 carbon atoms is bonded, such as methyl (meth)acrylate (methyl methacrylate and methyl acrylate), ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate, and eicosyl (meth)acrylate. Preferable of these are methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, and decyl (meth)acrylate, which are esters to which an alkyl group having 1 to 10 carbon atoms is bonded. These (meth)acrylic acid alkyl esters may be used singly or as a mixture of two or more.

Examples of polyfunctional styrenic monomers include aromatic divinyl compounds, such as divinylbenzene, divinylnaphthalene, and derivatives thereof; and the like. These polyfunctional styrenic monomers may be used singly or as a mixture of two or more.

Examples of polyfunctional (meth)acrylic monomers include ethylene glycol di(meth)acrylate (ethylene glycol dimethacrylate), trimethylolpropane tri(meth)acrylate, ethylene glycol di(meth)acrylate, diethylene glycol di(meth)acrylate, triethylene glycol di(meth)acrylate, decaethylene glycol di(meth)acrylate, pentadecaethylene glycol di(meth)acrylate, pentacontahectaethylene glycol di(meth)acrylate, 1,3-butylene di(meth)acrylate, allyl(meth)acrylate (allyl methacrylate and allyl acrylate), trimethylolpropane tri (meth)acrylate, pentaerythritol tetraacrylate, and the like. Of these, ethylene glycol di(meth)acrylate (ethylene glycol dimethacrylate) and allyl (meth)acrylate (allyl methacrylate) are preferable. These polyfunctional (meth)acrylic monomers may be used singly or as a mixture of two or more.

pH of Vinyl-Based Resin Particles

In the present invention, the pH of a dispersion obtained when the vinyl-based resin particles of the present invention are dispersed in water so that the mass ratio of the vinyl-based resin particles to water is 1:10 (dispersion of the vinyl-based resin particles) is preferably 3 to 9, more preferably 4 to 8, even more preferably 4.5 to 7.5, and particularly preferably 5 to 7.

The water may be, for example, natural water, purified water, distilled water, ion-exchanged water, pure water, or the like. Among these, ion-exchanged water is preferable. Further, ion-exchanged water having a pH in the range of 5.5 to 7 is more preferable.

Thermosetting Resin

The vinyl-based resin particles of the present invention are used for making a thermosetting resin porous. Examples of thermosetting resins include polyphenylene ether resins, divinyl benzyl ether resins, polyarylate resins, diallyl phthalate resins, polyimide resins, benzoxazine resins, benzoxazole resins, bismaleimide resins, acrylate resins, and the like. The vinyl-based resin particles of the present invention can be particularly suitably used as a pore-forming material for a polyimide resin among these thermosetting resins. When the vinyl-based resin particles of the present invention are used as a pore-forming material for a polyimide resin, uniform pores can be famed in a polyimide resin film.

Rsp Value

In the present invention, the Rsp value of the vinyl-based resin particles is used as an index showing the compatibility between the vinyl-based resin particles and the thermosetting resin precursor solution.

The Rsp value is a numerical value defined by "transverse relaxation time $T_2$ (ms)" obtained by pulse NMR analysis of the physical properties of the thermosetting resin precursor solution in which the vinyl-based resin particles of the present invention are dispersed.

The Rsp value is represented by the following formula. The Rsp value can be measured with a pulsed NMR particle interface characterization device (e.g., Acorn Area, produced by XiGo Nanotools).

$$Rsp=(Rav-Rb)/Rb$$

Rav is the average relaxation time constant. The relaxation time constant is the reciprocal of the proton relaxation time of the thermosetting resin precursor solution that is in contact with or adsorbed to the surface of the vinyl-based resin particles when the vinyl-based resin particles are dispersed in the thermosetting resin precursor solution. The average relaxation time constant is the average value of the obtained relaxation time constants.

Rb is the proton relaxation time constant of a blank thermosetting resin precursor solution that does not contain the vinyl-based resin particles.

A larger Rsp value indicates a higher interaction between the surface of the vinyl-based resin particles and the thermosetting resin precursor solution.

The pulse NMR method is to observe the spin (magnetic) state of an object, and to measure the time from immediately after applying energy (excited state) to returning to a steady state (spin-spin relaxation time). When the object is a solvent, the relaxation time of the solvent molecules (hydrogen nuclei) is measured; however, in a particle dispersion, the relaxation time varies depending on the state of the particles in the solvent. This is because the relaxation time is affected by the amount of solvent molecules in contact with the particles. The amount of solvent molecules in contact with the particles is considered to vary due to the influence of the surface area of the particles and the wettability between the solvent and the molecules. Therefore, the interface state between the solvent and the particles can be grasped by pulse NMR measurement of the relaxation time of the solvent in a dispersion in which specific particles are dispersed. From this, minute state changes on the particle surface can be analyzed from the relaxation time of the solvent molecules.

There are various preferable methods for evaluating pulse NMR depending on the relaxation time, and the CPMG method is preferably used particularly for samples having a long relaxation time, such as liquids.

In the vinyl-based resin particles of the present invention, the Rsp value represented by the following formula (1) is preferably 5 or more and 150 or less.

$$Rsp=(Rav-Rb)/Rb \tag{1}$$

Rav: Reciprocal of average value of transverse relaxation time $T_2$ (ms) obtained by the following measurement method 1

Rb: Reciprocal of transverse relaxation time $T_2$ (ms) obtained by the following measurement method 2

Measurement Method 1

A vinyl-based resin particle dispersion is obtained by mixing the vinyl-based resin particles of the present invention and a first organic solvent in a mass ratio of 1:3, a polyimide precursor varnish is obtained by mixing the vinyl-based resin particle dispersion, a polyimide precursor solution with a solid concentration of 18±1 mass %, and a second organic solvent in a mass ratio of 6:3.61:1.8, the transverse relaxation time $T_2$ (ms) of protons derived from the varnish is measured three times by the Carr-Purcell Meiboom-Gill (CPMG) method using a hydrogen nucleus as a measurement nucleus at a measurement temperature of 20° C. at a resonance frequency of 13 MHz with a 90° pulse width of 5.81 μs to calculate an average value thereof, and the reciprocal of the average value is taken as Rav.

Measurement Method 2

A blank solution is obtained by mixing the first organic solvent, a polyimide precursor solution with a solid concentration of 18±1 mass %, and the second organic solvent in a mass ratio of 4.5:3.61:1.8, the transverse relaxation time $T_2$ (ms) of protons derived from the blank solution is measured three times by the CPMG method using a hydrogen nucleus as a measurement nucleus at a measurement temperature of 20° C. at a resonance frequency of 13 MHz with a 90° pulse width of 5.81 μs to calculate an average value thereof, and the reciprocal of the average value is taken as Rb.

When the Rsp value represented by formula (1) is 5 or more, the compatibility between the vinyl-based resin particles and the thermosetting resin precursor solution is not too low, and an increase in the viscosity of the thermosetting resin precursor solution, in which the vinyl-based resin particles are dispersed, tends to be suppressed.

When the Rsp value represented by formula (1) is 150 or less, the compatibility between the vinyl-based resin particles and the thermosetting resin precursor solution is not too high, and a decrease in the viscosity of the thermosetting resin precursor solution, in which the vinyl-based resin particles are dispersed, tends to be suppressed.

The Rsp value represented by formula (1) is more preferably 8 or more and 100 or less, even more preferably 10 or more and 80 or less, and particularly preferably 15 or more and 70 or less.

In both the measurement methods 1 and 2 described above, the first organic solvent and the second organic solvent are the same solvent. In the measurement methods 1 and 2, the first organic solvents are the same solvent, and the second organic solvents are also the same solvent.

Examples of the first organic solvent and the second organic solvent include phenol-based solvents, such as phenol and m-cresol; amide-based solvents, such as N-methyl-2-pyrrolidone (NMP), N,N-dimethylformamide (DMF), and N,N-dimethylacetamide (DMAC); lactone-based solvents, such as γ-butyrolactone (GBL), δ-valerolactone, ε-caprolactone, γ-crotonolactone, γ-hexanolactone, α-methyl-γ-butyrolactone, γ-valerolactone, α-acetyl-γ-butyrolactone, and δ-hexanolactone; sulfoxide-based solvents, such as N,N-dimethyl sulfoxide (DMSO); ketone-based solvents, such as acetone, methyl ethyl ketone, methyl isobutyl ketone, and cyclohexanone; and ester-based solvents, such as methyl acetate, ethyl acetate, butyl acetate, and dimethyl carbonate. Of these, NMP, GBL, or DMAC is preferable, in terms of the solubility of the polyimide precursor.

In the vinyl-based resin particles of the present invention, the Rsp value represented by the following formula (1) is more preferably 5 or more and 150 or less.

$$Rsp=(Rav-Rb)/Rb \quad (1)$$

Rav: Reciprocal of average value of transverse relaxation time $T_2$ (ms) obtained by the following measurement method 1

Rb: Reciprocal of transverse relaxation time $T_2$ (ms) obtained by the following measurement method 2

Measurement Method 1

A vinyl-based resin particle dispersion is obtained by mixing the vinyl-based resin particles of the present invention and NMP, GBL, or DMAC as a first organic solvent in a mass ratio of 1:3, a polyimide precursor varnish is obtained by mixing the vinyl-based resin particle dispersion, a polyimide precursor solution with a solid concentration of 18±1 mass %, and NMP, GBL, or DMAC as a second organic solvent in a mass ratio of 6:3.61:1.8, the transverse relaxation time $T_2$ (ms) of protons derived from the varnish is measured three times by the Carr-Purcell Meiboom-Gill (CPMG) method using a hydrogen nucleus as a measurement nucleus at a measurement temperature of 20° C. at a resonance frequency of 13 MHz with a 90° pulse width of 5.81 μs to calculate an average value thereof, and the reciprocal of the average value is taken as Rav. The first organic solvent and the second organic solvent are the same solvent.

Measurement Method 2

A blank solution is obtained by mixing the first organic solvent used in the measurement method 1, a polyimide precursor solution with a solid concentration of 18±1 mass %, and the second organic solvent used in the measurement method 1 in a mass ratio of 4.5:3.61:1.8, the transverse relaxation time $T_2$ (ms) of protons derived from the blank solution is measured three times by the CPMG method using a hydrogen nucleus as a measurement nucleus at a measurement temperature of 20° C. at a resonance frequency of 13 MHz with a 90° pulse width of 5.81 μs to calculate an average value thereof, and the reciprocal of the average value is taken as Rb.

2. Method for Producing Vinyl-Based Resin Particles

The production method A and production method B for vinyl-based resin particles according to the present invention are described below in detail. The present invention is not limited to the following production methods.

Production Method A for Vinyl-Based Resin Particles

The production method A is a method for producing vinyl-based resin particles, comprising (1) a seed polymerization step, (2) a spray-drying step, and (3) a crushing step, in this order. Further, in the seed polymerization step in the production method A, the first polymerizable vinylic monomer comprises a monofunctional monomer and a polyfunctional monomer, and the first polymerizable vinylic monomer comprises the polyfunctional monomer in an amount of 8 to 150 parts by mass based on 100 parts by mass of the monofunctional monomer.

The above steps (1) to (3) are described in detail below.

Seed Polymerization Step

In the production method A, the seed polymerization step is a step of performing seed polymerization by absorbing a first polymerizable vinylic monomer into seed particles to obtain an aqueous dispersion containing polymer particles of the first polymerizable vinylic monomer and an aqueous medium (slurry containing polymer particles).

In the production method A, the seed polymerization means a polymerization method in which after a first polymerizable vinylic monomer is impregnated and absorbed into seed particles the first polymerizable vinylic monomer is polymerized. For the seed polymerization in the production method A, for example, the method described in JP2010-138365A can be applied.

The seed particles can be produced by applying a known method. For example, the seed particles can be produced by applying the method described in WO2013/030977.

The seed particles can be obtained by emulsion polymerization, preferably soap-free polymerization, of a monomer for producing seed particles in an aqueous medium.

The monomer for producing the seed particles is preferably a monofunctional monomer.

The monofunctional monomer is preferably at least one member selected from the group consisting of a monofunctional styrenic monomer and a monofunctional (meth)acrylic monomer.

Examples of monofunctional styrenic monomers include styrene, o-methylstyrene, m-methylstyrene, p-methylstyrene, α-methylstyrene; styrene sulfonic acid salts, such as sodium styrene sulfonate and ammonium styrene sulfonate; and the like. Of these, styrene, α-methylstyrene, and sodium styrene sulfonate are preferable. These monofunctional styrenic monomers may be used singly or as a mixture of two or more.

Examples of monofunctional (meth)acrylic monomers include (meth)acrylic acid alkyl esters to which an alkyl group having 1 to 20 carbon atoms is bonded, such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, isostearyl (meth)acrylate, nonadecyl (meth)acrylate, and eicosyl (meth)acrylate. Preferable of these are methyl (meth)acrylate, ethyl (meth)acrylate, propyl (meth) acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth) acrylate, nonyl (meth)acrylate, isononyl (meth)acrylate, and decyl (meth)acrylate, which are esters to which an alkyl group having 1 to 10 carbon atoms is bonded. These (meth)acrylic acid alkyl esters may be used singly or as a mixture of two or more.

The aqueous medium for producing the seed particles is, for example, water or a mixed solvent of water and an organic solvent (e.g., a hydrophilic organic solvent such as a lower alcohol having 5 or fewer carbon atoms). The amount of the aqueous medium is preferably 100 to 1000 parts by mass, based on 100 parts by mass of the monofunctional monomer, in order to stabilize the vinyl-based resin particles.

Moreover, in the seed polymerization step, a wide variety of known polymerization inhibitors commonly used in this field can be used to suppress the formation of emulsion particles in the aqueous medium. Examples of polymerization inhibitors include nitrite compounds, such as sodium nitrite. The polymerization inhibitor can be used in an amount of 0.1 to 10 parts by mass, based on 100 parts by mass of the monofunctional monomer.

Further, in the seed polymerization step, a wide variety of known molecular-weight-regulating agents commonly used in this field can be used to regulate the molecular weight. The molecular-weight-regulating agent can be used in an amount of 0.1 to 10 parts by mass, based on 100 parts by mass of the monofunctional monomer.

In the production of the seed particles, a water-soluble polymerization initiator is generally used. The water-soluble polymerization initiator may be any polymerization initiator that is soluble in an aqueous medium, and known water-soluble polymerization initiators can be used. Examples include peroxides, such as potassium persulfate and ammonium persulfate; and azo compounds, such as 2,2-azobis-(2-methylpropionamidine)-dihydrochloride, 2,2-azobis-[2-(2-imidazolin-2-yl)propane])-dihydrochloride, and 4,4-azobis-(4-cyanovaleric acid).

The water-soluble polymerization initiator is generally used in an amount of 0.1 to 5 parts by mass, based on 100 parts by mass of the monofunctional monomer. Moreover, the polymerization for producing the seed particles can be performed by heating at 50 to 80° C. for 2 to 20 hours.

The first polymerizable vinylic monomer comprises a monofunctional monomer and a polyfunctional monomer, and the first polymerizable vinylic monomer comprises the polyfunctional monomer in an amount of 30 to 100 parts by mass, based on 100 parts by mass of the monofunctional monomer.

In the seed polymerization step, if the amount of the polyfunctional monomer is less than 30 parts by mass based on 100 parts by mass of the monofunctional monomer, the solvent resistance of the vinyl-based resin particles may be reduced. An amount of the polyfunctional monomer of less than 30 parts by mass is also not preferable in terms of handling because the vinyl-based resin particles are likely to swell in a solvent when a thermosetting resin precursor is prepared, which may increase the viscosity of the precursor.

In the seed polymerization step, if the amount of the polyfunctional monomer is more than 100 parts by mass based on 100 parts by mass of the monofunctional monomer, it becomes difficult to decompose vinyl-based resin particles added for making a thermosetting resin porous. Thus, the vinyl-based resin particles may remain in the thermosetting resin, making it difficult to make a thermosetting resin film porous when the film is produced.

In the seed polymerization step, the first polymerizable vinylic monomer preferably comprises the polyfunctional monomer in an amount of 8 to 150 parts by mass, more preferably 12 to 100 parts by mass, and even more preferably 18 to 80 parts by mass, based on 100 parts by mass of the monofunctional monomer, in terms of improving the solvent resistance of the vinyl-based resin particles.

In the seed polymerization step, the monofunctional monomer is preferably at least one member selected from the group consisting of a monofunctional styrenic monomer and a monofunctional (meth)acrylic monomer.

Examples of monofunctional styrenic monomers include styrene, o-methylstyrene, m-methylstyrene, p-methylstyrene, α-methylstyrene; styrene sulfonic acid salts, such as sodium styrene sulfonate and ammonium styrene sulfonate; and the like. Of these, styrene, α-methylstyrene, and sodium styrene sulfonate are preferable. These monofunctional styrenic monomers may be used singly or as a mixture of two or more.

Examples of monofunctional (meth)acrylic monomers include (meth)acrylic acid alkyl esters to which an alkyl group having 1 to 20 carbon atoms is bonded, such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth) acrylate, isostearyl (meth)acrylate, nonadecyl (meth)acrylate, and eicosyl (meth)acrylate. Preferable of these are methyl (meth)acrylate, ethyl (meth)acrylate, propyl (meth) acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth) acrylate, nonyl (meth)acrylate, isononyl (meth)acrylate, and decyl (meth)acrylate, which are esters to which an alkyl group having 1 to 10 carbon atoms is bonded. These (meth)acrylic acid alkyl esters may be used singly or as a mixture of two or more.

In the seed polymerization step, the polyfunctional monomer is at least one member selected from the group consisting of a polyfunctional styrenic monomer and a polyfunctional (meth)acrylic monomer. Using the polyfunctional monomer increases the solvent resistance of the resulting vinyl-based resin particles and suppresses an increase in the viscosity of a polyimide varnish due to swelling of the resulting vinyl-based resin particles.

Examples of polyfunctional styrenic monomers include aromatic divinyl compounds, such as divinylbenzene, divinylnaphthalene, and derivatives thereof; and the like. These polyfunctional styrenic monomers may be used singly or as a mixture of two or more.

Examples of polyfunctional (meth)acrylic monomers include ethylene glycol di(meth)acrylate (ethylene glycol dimethacrylate), trimethylolpropane tri(meth)acrylate, ethylene glycol di(meth)acrylate, diethylene glycol di(meth)acrylate, triethylene glycol di(meth)acrylate, decaethylene glycol di(meth)acrylate, pentadecaethylene glycol di(meth)acrylate, pentacontahectaethylene glycol di(meth)acrylate, 1,3-butylene di(meth)acrylate, allyl(meth)acrylate (allyl methacrylate), trimethylolpropane tri(meth)acrylate, pentaerythritol tetraacrylate, and the like. Of these, ethylene glycol di(meth)acrylate (ethylene glycol dimethacrylate) and allyl (meth)acrylate (allyl methacrylate) are preferable. These polyfunctional (meth)acrylic monomers may be used singly or as a mixture of two or more.

In the seed polymerization step, an oil-soluble polymerization initiator is generally used. The oil-soluble polymerization initiator may be any polymerization initiator that is soluble in an aqueous medium. A known oil-soluble polymerization initiator can be used. Examples include peroxides, such as benzoyl peroxide (BPO), lauroyl peroxide, bis-3,5,5-trimethylhexanoyl peroxide, t-butylperoxy-2-ethylhexanoate, di-t-butylperoxyhexahydroterephthalate, and t-butylperoxy isobutyrate; and azo compounds, such as azobisisobutyronitrile, azobisisovaleronitrile, 2,2-azobis-(2-methylpropionate), and 2,2-azobis-(2,4-dimethylvaleronitrile) (ADVN). The amount of the oil-soluble polymerization initiator is preferably 0.001 to 3 parts by mass, more preferably 0.003 to 1 part by mass, and even more preferably 0.004 to 0.5 parts by mass, based on 100 parts by mass of the total amount of the monofunctional monomer and the polyfunctional monomer.

In the seed polymerization step, a suspension stabilizer can be used to improve polymerization stability in producing polymer particles of the first polymerizable vinylic monomer and to increase the effect of suppressing fusion between the polymer particles. Examples of suspension stabilizers include water-soluble polymers, such as polyvinyl alcohol and polyvinylpyrrolidone.

The amount of the suspension stabilizer is generally 0.5 to 15 parts by mass, based on 100 parts by mass of the total amount of the monofunctional monomer and the polyfunctional monomer.

In the seed polymerization step, a surfactant can be used. Adding a surfactant suppresses fusion between particles forming the polymer particles obtained by seed polymerization. Moreover, emulsifying the monomer mixture using a surfactant in an aqueous medium promotes absorption of the monomer mixture into seed particles in seed polymerization described later.

The surfactant may be an anionic, cationic, nonionic, or zwitterionic surfactant.

Examples of anionic surfactants include dialkylsulfosuccinic acid salts, such as sodium dioctyl sulfosuccinate; phosphoric acid salts, such as sodium polyoxyethylene alkyl phenyl ether phosphate (e.g., sodium polyoxyethylene nonylphenyl ether phosphate) and sodium polyoxyalkylene aryl ether phosphate; fatty acid oils, such as sodium oleate and castor oil potassium; alkyl sulfuric acid salts, such as sodium lauryl sulfate and ammonium lauryl sulfate; alkylbenzene sulfonic acid salts, such as sodium dodecylbenzenesulfonate; alkylnaphthalene sulfonic acid salts; alkanesulfonic acid salts; alkyl phosphoric acid ester salts; naphthalenesulfonic acid-formalin condensates; polyoxyethylene alkylphenyl ether sulfuric acid ester salts; polyoxyethylene alkyl sulfuric acid ester salts; and the like.

Examples of nonionic surfactants include polyoxyethylene alkyl ethers, such as polyoxyethylene tridecyl ether; polyoxyethylene alkylphenyl ether; polyoxyethylene styrenated phenyl ether; polyoxyalkylene alkyl ethers, such as polyoxyalkylene tridecyl ether containing an alkylene group having 3 or more carbon atoms; polyoxyethylene fatty acid ester; sorbitan fatty acid ester; polyoxyethylene sorbitan fatty acid esters, such as polyoxyethylene sorbitan monolaurate;

polyoxyethylene alkylamine; glycerol fatty acid ester; oxyethylene-oxypropylene block copolymers; and the like.

Examples of cationic surfactants include alkylamine salts, such as laurylamine acetate and stearylamine acetate; quaternary ammonium salts, such as lauryltrimethylammonium chloride; and the like.

Examples of zwitterionic surfactants include lauryldimethylamine oxide, and phosphoric acid ester or phosphorous acid ester surfactants.

Among the above surfactants, it is preferable to use at least one of an anionic surfactant and a nonionic surfactant. Of the above surfactants, sodium dioctyl sulfosuccinate and sodium polyoxyethylene nonylphenyl ether phosphate are preferable as anionic surfactants, and polyoxyethylene alkylphenyl ether and polyoxyethylene styrenated phenyl ether are preferable as nonionic surfactants.

The amount of surfactant is preferably 0.001 to 5 parts by mass, more preferably 0.005 to 3 parts by mass, and even more preferably 0.01 to 1 part by mass, based on 100 parts by mass of the total amount of the monofunctional monomer and the polyfunctional monomer.

In the seed polymerization step, an antioxidant can be used to improve the heat resistance of vinyl-based resin particles. Examples of usable antioxidants include phenol-based antioxidants, such as 2,6-di-t-butyl-4-methylphenol, n-octadecyl-3-(3',5'-di-t-butyl-4'-hydroxyphenyl)propionate, tetrakis[3-(3,5-di-t-butyl-4-hydroxyphenyl)propionyloxymethyl]methane, tris[N-(3,5-di-t-butyl-4-hydroxybenzyl)]isocyanurate, butylidene-1,1-bis(2-methyl-4-hydroxy-5-t-butylphenyl), triethylene glycol bis[3-(3-t-butyl-4-hydroxy-5-methylphenyl)propionate], and 3,9-bis{2-[3(3-t-butyl-4-hydroxy-5-methylphenyl)propionyloxy]-1,1-dimethylethyl}-2,4,8,10-tetraoxaspiro[5.5]undecane; sulfur-based antioxidants, such as dilauryl-3,3'-thio-dipropionate, dimyristyl-3,3'-thio-dipropionate, distearyl-3,3'-thio-dipropionate, pentaerythritol tetrakis(3-laurylthio-propionate), pentaerythritol tetrakis thioglycolate (PETG), pentaerythritol thiopropionate, pentaerythritol tetrakis(4-butanate), pentaerythritol tetrakis(6-mercaptohexanate), trimethylolpropane tristhioglycolate, trimethylolpropane tristhiopropionate, trimethylolpropane tristhiobutanate, butanediol bisthioglycolate, ethylene glycol bisthioglycolate, hexanediol bisthioglycolate, butanediol bisthiopropionate, ethylene glycol bisthiopropionate, octyl thioglycolate, 1-octanethiol, 1-dodecanethiol, and thiosalicylic acid; phosphorus-based antioxidants, such as tris(nonylphenyl) phosphite, tris(2,4-di-t-butylphenyl)phosphite, distearyl pentaerythritol diphosphite, bis(2,4-di-t-butylphenyl)pentaerythritol phosphite, and 2,2-methylenebis(4,6-di-t-butylphenyl)-4,4'-biphenylene diphosphonite; and the like. These antioxidants can be used singly or in a combination of two or more.

The amount of antioxidant is preferably 0.001 to 5 parts by mass, more preferably 0.005 to 3 parts by mass, and even more preferably 0.01 to 1 part by mass, based on 100 parts by mass of the total amount of the monofunctional monomer and the polyfunctional monomer.

Spray-Drying Step

In the production method A, the spray-drying step is a step of spray-drying the aqueous dispersion (slurry containing the polymer particles) obtained in the seed polymerization step at a slurry inlet temperature of 80 to 220° C. and a powder outlet temperature of 50 to 100° C. to obtain an aggregate.

In the spray-drying step, spray drying is performed to obtain an aggregate of vinyl-based resin particles from the slurry containing the polymer particles.

The spray-drying method is generally a method in which the slurry containing the polymer particles is sprayed using a spray-drying apparatus, such as a spray dryer, to dry the particles. The particle diameter, particle shape, and the like of the aggregate of vinyl-based resin particles can be adjusted by appropriately adjusting, for example, the supply rate of the slurry containing the polymer particles, the drying temperature, and the atomizer rotation rate of a spray-drying apparatus in spray drying.

Regarding the drying temperature, the temperature at a slurry inlet through which the slurry containing the polymer particles is introduced by spraying is within the range of 80 to 220° C., and the temperature at a powder outlet through which an aggregate of vinyl-based resin particles is discharged is within the range of 50 to 100° C. If the temperature at the slurry inlet through which the slurry containing the polymer particles is introduced is higher than 220° C., fusion between vinyl-based resin particles is likely to occur, thereby yielding an aggregate of the vinyl-based resin particles in which the vinyl-based resin particles are connected to each other. If the temperature at the slurry inlet through which the slurry containing the polymer particles is introduced is less than 80° C., the drying is likely to be insufficient, and the drying efficiency is too low.

If the powder outlet temperature is less than 50° C., the drying may be insufficient. If the powder outlet temperature is more than 100° C., fusion between vinyl-based resin particles is likely to occur.

The temperature at the slurry inlet through which the slurry containing the polymer particles is introduced is preferably 90 to 200° C., and the temperature at the powder outlet through which an aggregate of vinyl-based resin particles is discharged is preferably 55 to 95° C.

Further, the temperature at the slurry inlet through which the slurry containing the polymer particles is introduced is preferably 30 to 120° C. higher than the aggregate outlet temperature (the temperature at the powder outlet through which an aggregate of vinyl-based resin particles is discharged), in terms of preventing fusion between vinyl-based resin particles.

Crushing Step

In the production method A, the crushing step is a step of crushing the aggregate obtained in the spray-drying step to obtain vinyl-based resin particles.

In the crushing step, the aggregate obtained in the spray-drying step can be crushed with high efficiency by using a pulverizer to obtain vinyl-based resin particles.

As the pulverizer, a spiral jet mill, such as a Current Jet Mill or Super Jet Mill (produced by Nisshin Engineering Inc.) can be used.

Classification Step

The production method A preferably comprises at least one of a first classification step of classifying the polymer particles in the aqueous dispersion obtained in the seed polymerization step and a second classification step of classifying the vinyl-based resin particles obtained in the crushing step.

In the first classification step, coarse particles having a size larger than the sieve opening can be removed by wet classification using a nylon mesh. For example, in the first classification step, coarse particles having a size of 32 μm or more can be removed by using, for example, a 400-mesh nylon screen.

In the second classification step, vinyl-based resin particles having a desired particle diameter can be obtained by classification using a classifier, such as an Elbow-Jet inertial classifier (produced by Nittetsu Mining Co., Ltd.), a Turboplex centrifugal classifier (produced by Hosokawa Micron Corporation), TSP separator centrifugal classifier (produced by Hosokawa Micron Corporation), or FACULTY (produced by Hosokawa Micron Corporation). For example, in the second classification step, vinyl-based resin particles that can be used as a product can be obtained by air classification.

pH Adjustment Step

The production method A preferably comprises a step of adding a nitrogen-containing compound to the aqueous dispersion (slurry containing the polymer particles) obtained in the seed polymerization step to adjust the pH of the aqueous dispersion to 3 to 9.

The nitrogen-containing compound is preferably one or more members selected from the group consisting of ammonia, alkanolamines, and polyamines.

Examples of alkanolamines include monoethanolamine, diethanolamine, triethanolamine, isopropanolamine, and the like.

Examples of polyamines include aliphatic amines, such as ethylenediamine, propylenediamine, hexamethylenediamine, diethylenetriamine, and triethylenetetramine; aromatic polyamines, such as phenylenediamine and tolylenediamine; and heterocyclic polyamines, such as piperazine and aminoethylpiperazine.

Production Method B for Vinyl-Based Resin Particles

The production method B is a method for producing vinyl-based resin particles, comprising (1) an emulsion polymerization step, (2) a spray-drying step, and (3) a crushing step, in this order. These steps are described in detail below.

Emulsion Polymerization Step

In the production method B, the emulsion polymerization step is a step of emulsion-polymerizing a second polymerizable vinylic monomer in an aqueous medium to obtain an aqueous dispersion containing polymer particles of the second polymerizable vinylic monomer and the aqueous medium (slurry containing polymer particles).

Emulsion polymerization is characterized by less variation in the diameter of particles forming the resulting aggregate. For the emulsion polymerization in the production method B, for example, the method described in JP2010-138365A can be applied.

In the production method B, soap-free polymerization, which is emulsion polymerization that does not use a surfactant, is preferable among emulsion polymerization techniques.

In the emulsion polymerization step in the production method B, the second polymerizable vinylic monomer is preferably at least one member selected from the group consisting of a monofunctional monomer and a polyfunctional monomer.

The monofunctional monomer is preferably at least one member selected from the group consisting of a monofunctional styrenic monomer and a monofunctional (meth)acrylic monomer.

Examples of monofunctional styrenic monomers include styrene, o-methylstyrene, m-methylstyrene, p-methylstyrene, α-methylstyrene; styrene sulfonic acid salts, such as sodium styrene sulfonate and ammonium styrene sulfonate; and the like. Of these, styrene, α-methylstyrene, and sodium styrene sulfonate are preferable. These monofunctional styrenic monomers may be used singly or as a mixture of two or more.

Examples of monofunctional (meth)acrylic monomers include (meth)acrylic acid alkyl esters to which an alkyl group having 1 to 20 carbon atoms is bonded, such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate, and eicosyl (meth)acrylate. Preferable of these are methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, and decyl (meth)acrylate, which are esters to which an alkyl group having 1 to 10 carbon atoms is bonded. These (meth)acrylic acid alkyl esters may be used singly or as a mixture of two or more.

In the emulsion polymerization step, the second polymerizable vinylic monomer and one or more other monomers such as a vinyl halide monomer and a vinyl cyanide monomer can be used in combination. Examples of vinyl halide monomers include vinyl chloride, vinylidene chloride, and the like. Examples of vinyl cyanide monomers include acrylonitrile, methacrylonitrile, and the like.

In the emulsion polymerization step, the aqueous medium is, for example, water or a mixed solvent of water and an organic solvent (e.g., a hydrophilic organic solvent such as a lower alcohol having 5 or fewer carbon atoms). The amount of the aqueous medium is preferably 100 to 1000 parts by mass, based on 100 parts by mass of the second polymerizable vinylic monomer, in order to stabilize the vinyl-based resin particles.

Further, in the emulsion polymerization step, a wide variety of known molecular-weight-regulating agents commonly used in this field can be used to regulate the molecular weight. The molecular-weight-regulating agent can be used in an amount of 0.1 to 10 parts by mass, based on 100 parts by mass of the second polymerizable vinylic monomer.

In the emulsion polymerization step, a water-soluble polymerization initiator is generally used. The water-soluble polymerization initiator may be any polymerization initiator that is soluble in an aqueous medium, and known water-soluble polymerization initiators can be used. Examples include peroxides, such as potassium persulfate and ammonium persulfate (APS); and azo compounds, such as 2,2-azobis-(2-methylpropionamidine)-dihydrochloride, 2,2-azobis-[2-(2-imidazolin-2-yl)propane])-dihydrochloride, and 4,4-azobis-(4-cyanovaleric acid). The water-soluble polymerization initiator is generally used in an amount of 0.1 to 5 parts by mass, based on 100 parts by mass of the second polymerizable vinylic monomer.

In the emulsion polymerization step, a wide variety of known surfactants commonly used in this field can be used. Addition of a surfactant suppresses the fusion between the particles that form the polymer obtained by emulsion polymerization. When soap-free polymerization is performed, it is not necessary to add a surfactant.

In the emulsion polymerization step, the average particle diameter can be adjusted by performing seeded emulsion polymerization using seed particles. When emulsion polymerization is performed by adding a monomer mixture, a water-soluble initiator, and seed particles to an aqueous medium, the polymerization proceeds while the vinylic monomer is absorbed as an oligosoap into the seed particles, and polymer particles having a uniform particle diameter can be obtained.

The seed particles can be obtained by emulsion polymerization, preferably soap-free polymerization, of a monomer for producing seed particles in an aqueous medium.

As the monomer for producing the seed particles, a second polymerizable vinylic monomer described above can be used. Among the second polymerizable vinylic monomers, at least one member selected from the group consisting of a monofunctional styrenic monomer and a monofunctional (meth)acrylic monomer described above is preferably used. Preferable examples of monofunctional styrenic monomers are styrene, α-methylstyrene, and sodium styrene sulfonate. A preferable example of monofunctional (meth)acrylic monomers is methyl (meth)acrylate.

The aqueous medium for producing the seed particles may be an aqueous medium described above.

In the production of the seed particles, a water-soluble polymerization initiator described above can be used. The water-soluble polymerization initiator is generally used in an amount of 0.1 to 5 parts by mass, based on 100 parts by mass of the monomer for producing the seed particles.

In the production of the seed particles, a wide variety of known molecular-weight-regulating agents commonly used in this field can be used to regulate the molecular weight. It is preferable to use a molecular-weight-regulating agent in an amount of 0.1 to 10 parts by mass, based on 100 parts by mass of the monomer for producing the seed particles.

The polymerization for producing the seed particles can be performed by heating at 50 to 80° C. for 2 to 20 hours.

The polymerization proceeds while the second polymerizable vinylic monomer is absorbed as an oligosoap into the seed particles, thus obtaining polymer particles derived from the polymerizable vinylic monomer.

The polymerization temperature can be appropriately selected depending on the types of second polymerizable vinylic monomer and polymerization initiator. The polymerization temperature is preferably 25 to 110° C., and more preferably 50 to 100° C. The polymerization time is preferably 1 to 12 hours.

Spray-Drying Step

In the production method B, the spray-drying step is a step of spray-drying the aqueous dispersion (slurry containing the polymer particles) obtained in the emulsion polymerization step at an inlet temperature of 80 to 220° C. and an outlet temperature of 50 to 100° C. to obtain an aggregate.

In the spray-drying step, spray drying is performed to obtain an aggregate of vinyl-based resin particles from the slurry containing the polymer particles.

The spray-drying method is generally a method in which the slurry containing the polymer particles is sprayed using a spray-drying apparatus, such as a spray dryer, to dry the particles. The particle diameter, particle shape, and the like of the aggregate of vinyl-based resin particles can be adjusted by appropriately adjusting, for example, the supply rate of the slurry containing the polymer particles, the drying temperature, and the atomizer rotation rate of a spray-drying apparatus in spray drying.

Regarding the drying temperature, the temperature at a slurry inlet through which the slurry containing the polymer particles is introduced by spraying (also referred to below as "the slurry inlet temperature") is within the range of 80 to 220° C., and the temperature at a powder outlet through which an aggregate of vinyl-based resin particles is discharged is within the range of 50 to 100° C.

If the temperature at the slurry inlet through which the slurry containing the polymer particles is introduced is higher than 220° C., fusion between vinyl-based resin particles is likely to occur, thereby yielding an aggregate of the vinyl-based resin particles in which the vinyl-based resin particles are connected to each other.

If the temperature at the slurry inlet through which the slurry containing the polymer particles is introduced is less than 80° C., the drying is likely to be insufficient, and the drying efficiency is too low.

If the powder outlet temperature is less than 50° C., the drying may be insufficient. If the powder outlet temperature is more than 100° C., fusion between vinyl-based resin particles is likely to occur.

The temperature at the slurry inlet through which the slurry containing the polymer particles is introduced is preferably 90 to 200° C., and the temperature at the powder outlet through which an aggregate of vinyl-based resin particles is discharged is preferably 55 to 95° C.

Further, the temperature at the slurry inlet through which the slurry containing the polymer particles is introduced is preferably 30 to 120° C. higher than the aggregate outlet temperature (the temperature at the powder outlet through which an aggregate of vinyl-based resin particles is discharged), in terms of preventing fusion between vinyl-based resin particles.

Crushing Step

In the production method B, the crushing step is a step of crushing the aggregate obtained in the spray-drying step to obtain vinyl-based resin particles.

In the crushing step, the aggregate obtained in the spray-drying step can be crushed with high efficiency by using a pulverizer to obtain vinyl-based resin particles.

As the pulverizer, a spiral jet mill, such as a Current Jet Mill or Super Jet Mill (produced by Nisshin Engineering Inc.) can be used.

pH Adjustment Step

The production method B preferably comprises a pH adjustment step of adding a nitrogen-containing compound to the aqueous dispersion (slurry containing the polymer particles) obtained in the emulsion polymerization step to adjust the pH of the aqueous dispersion to 3 to 9.

The production method B preferably comprises the pH adjustment step between the emulsion polymerization step and the spray-drying step.

In the emulsion polymerization step, when soap-free polymerization is performed using persulfuric acid salt as a polymerization initiator, the polymer particles obtained in the production method B are negatively charged because anions such as persulfate ions are present on the surface of the polymer particles. If a polyimide precursor varnish is prepared using the negatively charged vinyl-based resin particles, electrostatic repulsion between polyamic acid, which is a polyimide precursor, and the negatively charged vinyl-based resin particles may occur, which is accompanied by an increase in the viscosity of the polyimide precursor varnish.

It can be surmised that adding a nitrogen-containing compound to the slurry containing the polymer particles suppresses the electrostatic repulsion and prevents an increase in the viscosity of the polyimide precursor varnish because amines derived from the nitrogen-containing compound are present as a cation paired with persulfate ions.

The nitrogen-containing compound is preferably one or more members selected from the group consisting of ammonia, alkanolamines, and polyamines.

Examples of alkanolamines include monoethanolamine, diethanolamine, triethanolamine, isopropanolamine, and the like.

Examples of polyamines include aliphatic amines, such as ethylenediamine, propylenediamine, hexamethylenediamine, diethylenetriamine, and triethylenetetramine; aromatic polyamines, such as phenylenediamine and tolylenediamine; and heterocyclic polyamines, such as piperazine and aminoethylpiperazine.

The presence of amines on the surface of the vinyl-based resin particles can be confirmed by various analysis methods, such as by the change in pH.

Specifically, when soap-free polymerization is performed using persulfuric acid salt as a polymerization initiator, the pH of the slurry is 1 to 2, which is in the strongly acidic range. The presence of amines can be confirmed by adding a nitrogen-containing compound so that the pH is 3 to 9, which is in the weakly acidic to weakly basic range.

In addition, the presence of amines on the surface of the vinyl-based resin particles can also be confirmed by analysis using time-of-flight secondary ion mass spectrometry (TOF-SIMS).

Classification Step

The production method B preferably comprises at least one of a first classification step of classifying the polymer particles in the aqueous dispersion obtained in the emulsion polymerization step and a second classification step of classifying the vinyl-based resin particles obtained in the crushing step.

The production method B preferably comprises the first classification step between the pH adjustment step and the spray-drying step.

In the first classification step, coarse particles having a size larger than the sieve opening can be removed by wet classification using a nylon mesh. For example, in the first classification step, coarse particles having a size of 32 μm or more can be removed by using, for example, a 400-mesh nylon screen.

In the second classification step, vinyl-based resin particles having a desired particle diameter can be obtained by classification using a classifier, such as an Elbow-Jet inertial classifier (produced by Nittetsu Mining Co., Ltd.), Turboplex centrifugal classifier (produced by Hosokawa Micron Corporation), TSP separator centrifugal classifier (produced by Hosokawa Micron Corporation), or FACULTY (produced by Hosokawa Micron Corporation). For example, in the second classification step, vinyl-based resin particles that can be used as a product can be obtained by air classification.

3. Method for Producing Porous Film

A method for producing a porous film is described in detail below. The method for producing a porous film is not limited to the following production method.

The method for producing a porous film comprises, in this order, (1) preparing a porous-film-forming coating solution containing vinyl-based resin particles and a thermosetting resin precursor, (2) applying the porous-film-forming coating solution to a substrate to form an unfired composite film containing the vinyl-based resin particles, and (3) firing the unfired composite film to form a porous film.

Porous films produced by the above production method can be applied to various fields that use porous films. For example, the porous films can be applied to heat-resistant materials, insulating materials for electronic parts, and the like.

Steps (1) to (3) are described in detail below.

Step (1)

In the method for producing a porous film, step (1) is a step of preparing a porous-film-forming coating solution containing the vinyl-based resin particles of the present invention and a thermosetting resin precursor.

Examples of the thermosetting resin precursor include precursors of polyphenylene ether resin, divinylbenzyl ether resin, polyarylate resin, diallylphthalate resin, polyimide resin, benzoxazine resin, benzoxazole resin, bismaleimide resin, acrylate resin, and the like.

Examples of the precursor of polyimide resin include polyamic acid. Polyamic acid can be obtained by polymerizing an aromatic tetracarboxylic dianhydride and an aromatic diamine.

The mass ratio of the vinyl-based resin particles to the total mass of the vinyl-based resin particles and the thermosetting resin precursor is preferably 30 to 70 mass %, and more preferably 40 to 60 mass %. Within this range, excellent coatability of a thermosetting resin precursor solution in which the vinyl-based resin particles are dispersed can be obtained. Therefore, when a thermosetting resin film (porous film) is produced, the surface of the film can be smoothed.

The porous-film-forming coating solution may contain an organic solvent as a diluent. Examples of organic solvents include phenol-based solvents, such as phenol and m-cresol; amide-based solvents, such as N-methyl-2-pyrrolidone (NMP), N,N-dimethylformamide (DMF), and N,N-dimethylacetamide (DMAC); lactone-based solvents, such as γ-butyrolactone (GBL), δ-valerolactone, ε-caprolactone, γ-crotonolactone, γ-hexanolactone, α-methyl-γ-butyrolactone, γ-valerolactone, α-acetyl-γ-butyrolactone, and δ-hexanolactone; sulfoxide-based solvents, such as N,N-dimethyl sulfoxide (DMSO); ketone-based solvents, such as acetone, methyl ethyl ketone, methyl isobutyl ketone, and cyclohexanone; and ester-based solvents, such as methyl acetate, ethyl acetate, butyl acetate, and dimethyl carbonate. Of these, NMP, GBL, and DMAC are preferable.

The mass ratio of the organic solvent to the total mass of the vinyl-based resin particles and the thermosetting resin precursor is preferably 15 to 35 mass %, and more preferably 20 to 30 mass %.

Step (2)

In the method for producing a porous film, step (2) is a step of applying the porous-film-forming coating solution prepared in step (1) to a substrate to form an unfired composite film containing the vinyl-based resin particles of the present invention.

Examples of the substrate used in this step include substrates mainly composed of triacetyl cellulose (TAC), poly-ethylene terephthalate (PET), polyethylene naphthalate, polybutylene terephthalate, polybutylene naphthalate, polyarylate, polytetramethylene terephthalate, or the like. The phrase "mainly composed of" refers to the component with the highest content ratio among the substrate components.

The thickness of the substrate is generally 20 μm or more and 300 μm or less, and preferably 30 μm or more and 200 μm or less.

The porous-film-forming coating solution is applied to the substrate and dried at normal pressure at 20 to 80° C. for 30 minutes to 2 hours to remove the organic solvent, thereby forming an unfired composite film containing the vinyl-based resin particles.

Step (3)

In the method for producing a porous film, step (3) is a step of firing the unfired composite film formed in step (2) to form a porous film.

When firing the unfired composite film, it may be fired as it is formed on the substrate, or may be fired after the unfired composite film is peeled off from the substrate in advance.

As the firing conditions, for example, the temperature is raised from 20° C. to 320° C. at a heating rate of 10° C./min, and then held at 320° C. for 5 hours, thereby burning out the vinyl-based resin particles, whereby the target porous film can be obtained.

EXAMPLES

The present invention is described in more detail below with reference to Examples; however, the present invention is not limited to these Examples.

The ion-exchanged water used in the Examples and Comparative Examples is water deionized with an ion exchange resin, and has a conductivity of 1.0 μS/cm or less.

First, the evaluation methods, measurement methods, and calculation methods in the Examples and Comparative Examples are described.

Method for Measuring pH of Vinyl-Based Resin Particles 2 g of obtained vinyl-based resin particles was added to 20 g of ion-exchanged water; and dispersed with a test tube mixer (Tube Mixer TRIO HM-1N, produced by AS ONE Corporation) and an ultrasonic homogenizer (Branson Sonifier 450 Advanced, produced by Emerson Japan, Ltd.) to obtain a dispersion.

The pH of the obtained dispersion was measured at room temperature (20 to 25° C.) with a handheld pH meter (D-51S, produced by Horiba, Ltd.). The obtained pH value was determined to be the pH of the vinyl-based resin particles.

Method for Measuring Number Average Particle Diameter of Seed Particles

The number average particle diameter of seed particles was measured with a laser diffraction scattering particle size distribution analyzer (LS230, produced by Beckman Coulter). Specifically, 0.1 g of a seed particle dispersion (slurry A obtained in Seed Particle Synthesis Example 1, or slurry B obtained in Seed Particle Synthesis Example 2) and 20 ml of a 2 mass % anionic surfactant solution were placed in a test tube, followed by dispersing operation with a test tube mixer (Tube Mixer TRIO HM-1N, produced by AS ONE Corporation) and an ultrasonic cleaner (Ultrasonic Cleaner VS-150, produced by AS ONE Corporation) for 5 minutes, thereby obtaining a dispersion. While irradiating the obtained dispersion with ultrasonic waves, the number average particle diameter of the seed particles in the dispersion was measured with the laser diffraction scattering particle size distribution analyzer.

The measurement conditions for the laser diffraction scattering particle size distribution analyzer are as follows.
Measurement Conditions for Laser Diffraction Scattering Particle Size Distribution Analyzer
Medium: water
Refractive index of medium: 1.333
Refractive index of solids: refractive index of seed particles
PIDS relative concentration: 40 to 55%

The optical model during the measurement was fitted to the refractive index of the produced seed particles. When one type of monomer was used for the production of seed particles, the refractive index of a homopolymer of the monomer was used as the refractive index of the seed particles. When multiple types of monomers were used for the production of seed particles, the weighted average of the refractive indexes of homopolymers of the monomers in tams of the amounts of the monomers was used as the refractive index of the seed particles.

From the measurement results, particle size distribution based on the number of seed particles was determined. The arithmetic mean in the particle size distribution on a number basis was defined as the number average particle diameter of seed particles.

Method for Measuring Number Average Particle Diameter of Vinyl-Based Resin Particles The number average particle diameter of vinyl-based resin particles was measured with a Coulter Multisizer™ 4e (analyzer, produced by Beckman Coulter). The measurement was carried out using an aperture calibrated according to the Multisizer™ 4e user's manual, published by Beckman Coulter.

The aperture used for measurement was suitably selected depending on the size of the vinyl-based resin particles to be measured. For example, an aperture having a size of 10 μm was selected for measurement in the particle diameter range of 0.2 to 6 μm, and an aperture having a size of 20 μm was selected for measurement in the particle diameter range of 0.4 to 16 μm.

The measurement sample used was a dispersion obtained by adding 0.1 g of vinyl-based resin particles to 100 ml of a 2 mass % aqueous solution of an anionic surfactant, and dispersing the particles with an ultrasonic homogenizer (Branson Sonifier 450 Advanced, produced by Emerson Japan, Ltd.). During measurement, gentle stirring was performed to an extent in which bubbles were not formed in the beaker. The measurement was ended when the measurement of 100000 vinyl-based resin particles was completed.

From the measurement results, particle size distribution data on a number basis of 100000 vinyl-based resin particles were obtained. The arithmetic mean obtained from the particle size distribution data on a number basis was defined as the number average particle diameter of vinyl-based resin particles.

Method for Calculating Coefficient of Variation of Number Average Particle Diameter of Vinyl-Based Resin Particles The coefficient of variation (CV value) of the number average particle diameter of vinyl-based resin particles was calculated according to the following equation.

Coefficient of variation of number average particle diameter of vinyl-based resin particles=[(standard deviation of particle size distribution based on the number of vinyl-based resin particles)/ (number average particle diameter of vinyl-based resin particles)]×100

Method for Measuring Proportion of Number of Particles Having Particle Diameter That is 2 to 10 Times Median Diameter (D50) on Number Basis of Vinyl-Based Resin Particles The proportion of the number of particles in the particle diameter range that is 2 to 10 times the median diameter D50 on a number basis with respect to the total number of vinyl-based resin particles was measured with a Coulter Multisizer™ 4e (analyzer produced by Beckman Coulter), as in the method for measuring the number average particle diameter.

The "median diameter D50 on a number basis" refers to a particle diameter at a cumulative fraction of 50% in particle size distribution on a number basis measured with a Coulter Multisizer™ 4e.

In the particle diameter measurement, an aperture was suitably selected so that a particle diameter range that is 1 to 10 times the median diameter D50 on a number basis could be measured. For example, a 10-μm aperture with the measurable range of 0.2 to 6 μm was selected when the D50 was 0.5 μm, and a 20-μm aperture with the measurable range of 0.4 to 12 μm was selected when the D50 was 1.0 μm.

Method for Evaluating Proportion of Coarse Particles

The proportion of coarse particles (proportion of the number of particles in the particle diameter range that is 2 to 10 times the median diameter D50 on a number basis with respect to the total number of vinyl-based resin particles) was determined in the following manner.

Specifically, the proportion of the number of particles having a particle diameter that is 2 to 10 times the median diameter D50 on a number basis with respect to the total number of vinyl-based resin particles was measured from the particle size distribution data on a number basis of 100000 vinyl-based resin particles, which was obtained by the method for measuring the number average particle diameter of vinyl-based resin particles described above, to determine the proportion of coarse particles.

The "median diameter D50 on a number basis with respect to the total number of vinyl-based resin particles" refers to a particle diameter at a cumulative fraction of 50% in the particle size distribution on a number basis of 100000 vinyl-based resin particles measured with a Coulter Multisizer™ 4e (analyzer produced by Beckman Coulter).

In the measurement of the number average particle diameter of vinyl-based resin particles, an aperture was suitably selected so that particles having a particle diameter that is 1 to 10 times the median diameter D50 on a number basis could be measured. For example, a 10-μm aperture with the measurable range of 0.2 to 6 μm was selected when the D50 was 0.5 μm, and a 20-μm aperture with the measurable range of 0.4 to 12 μm was selected when the D50 was 1.0 μm.

A proportion of coarse particles of 0 to 5% was considered to be small.

Method for Measuring Temperature at 10% Mass Loss

The temperature at 10% mass loss (also referred to as "10% thermal decomposition temperature") was measured with a TG/DTA6200 thermogravimetric-differential thermal analyzer (produced by SII NanoTechnology Inc.).

First, an aluminum measurement container was filled with about 15 mg of vinyl-based resin particles as a sample at the bottom thereof, without leaving any space. The air flow was 200 mL/min, and alumina was used as a reference material.

A mass loss curve (TG/DTA curve) when the temperature was raised from 40° C. to 500° C. at a rate of 10° C./min was then obtained.

The temperature at which the mass was lost by 10% was read from the mass loss curve obtained according to this measurement by using analysis software included with the TGA apparatus, and was defined as the 10% thermal decomposition temperature.

Method for Measuring Mass Loss Percentage

The mass loss percentage was measured with the thermogravimetric-differential thermal analyzer described above.

First, an aluminum measurement container was filled with about 15 mg of vinyl-based resin particles as a sample at the bottom thereof, without any space. The air flow was 200 mL/min, and alumina was used as a reference material.

The mass loss behavior when the particles were heated at 350° C. for 5 hours after being heated from 40° C. to 350° C. at a rate of 10° C./min was then measured.

The mass loss percentage was determined by reading mass loss immediately after heating at 350° C. for 5 hours from the mass loss curve obtained according to this measurement.

Evaluation of Viscosity of Polyimide Precursor Varnish 5 mL of a polyimide precursor varnish containing vinyl-based resin particles (measurement sample) was taken, and maintained with a cone-plate type viscometer (model: DV2TCP, produced by Brookfield) at a spindle speed of 10 rpm at 25° C. for 20 seconds; the displayed value that became stable was determined to be the viscosity of the polyimide precursor varnish. The spindle for use in measurement was a CPA-42Z spindle, and varnishes for which an overtorque was observed were measured with a CPA-51Z spindle. For measurement, polyimide precursor varnishes that were stirred for deforming for 3 minutes with a defoaming stirrer (produced by Kurabo Industries Ltd., trade name: Mazerustar KK, model number: 250S) were used. In the following Test Examples 1 to 9, the CPA-42Z spindle was used; and in Test Examples 10 to 13, the CPA-51Z spindle was used.

Method for Evaluating Porous Polyimide Film

A porous polyimide film was observed with a scanning electron microscope (SEM) at 10,000× magnification to determine whether pores (the pores of the porous polyimide film) formed by loss of the vinyl-based resin particles due to burning were present. A hundred pores in the porous polyimide film were randomly selected, and subjected to measurement with the length measurement tool of the SEM to determine the major axis and minor axis of the pores in the porous polyimide film.

The average pore diameter of the pores in the porous polyimide film was defined as follows.

(major axis of pore in porous polyimide film+minor axis of pore in porous polyimide film)/2=average pore diameter of pore in porous polyimide film (simply "average pore diameter" below).

Additionally, the produced porous polyimide film was observed with a magnifying microscope, and the maximum film thickness and the minimum film thickness of the surface of the porous polyimide film were measured with the length measurement tool of the magnifying microscope.

Below, Synthesis Examples of the seed particles used in the Examples and Comparative Examples are described.

Seed Particle Synthesis Example 1

In a polymerization vessel equipped with a stirrer and a thermometer, 20 g of methyl methacrylate (MMA) as a monofunctional (meth)acrylic monomer (first polymerizable vinylic monomer) and 0.4 g of n-octyl mercaptan as a molecular-weight-regulating agent were mixed to prepare an oil phase ("oil phase 1" below). In another polymerization vessel equipped with a stirrer and a thermometer, 80 g of ion-exchanged water as an aqueous medium, 0.072 g of sodium styrene sulfonate as a monofunctional styrenic monomer (first polymerizable vinylic monomer), and 0.1 g of potassium persulfate as a polymerization initiator were placed. The oil phase 1 was then added to the other polymerization vessel, and the mixture was heated to 70° C. with stirring. Thereafter, stirring was continued, and soap-free polymerization was performed at an internal temperature of 70° C. for 12 hours to obtain slurry A. The number average particle diameter of seed particles (polymethyl methacrylate particles) in the obtained slurry A was 0.28 μm.

Seed Particles Synthesis Example 2

In a polymerization vessel equipped with a stirrer and a thermometer, 30 g of methyl methacrylate (MMA) as a monofunctional (meth)acrylic monomer (first polymerizable vinylic monomer) and 0.6 g of n-octyl mercaptan as a molecular-weight-regulating agent were mixed to prepare an oil phase ("oil phase 2" below). In another polymerization vessel equipped with a stirrer and a thermometer, 70 g of ion-exchanged water as an aqueous medium, 0.21 g of sodium styrene sulfonate as a monofunctional styrenic monomer (first polymerizable vinylic monomer), and 0.15 g of potassium persulfate as a polymerization initiator were placed. The oil phase 2 was then added to the other polymerization vessel, and the mixture was heated to 80° C. with stirring. Thereafter, stirring was continued, and soap-free polymerization was performed at an internal temperature of 80° C. for 4 hours, followed by heating to 100° C. Thereafter, stirring was continued, and polymerization was performed at an internal temperature of 100° C. for 1 hour to obtain slurry B. The number average particle diameter of seed particles (polymethyl methacrylate particles) in the obtained slurry B was 0.195 μm.

Example 1

Production Example of Vinyl-Based Resin Particles A

In a polymerization vessel equipped with a stirrer and a thermometer, 20.9 g of isobutyl methacrylate as a monofunctional (meth)acrylic monomer (first polymerizable vinylic monomer), 8.9 g of ethylene glycol dimethacrylate as a polyfunctional (meth)acrylic monomer (first polymerizable vinylic monomer), and 0.15 g of 2,2-azobis-(2,4-dimethylvaleronitrile) as a polymerization initiator were mixed to obtain a monomer mixture.

63.3 g of ion-exchanged water as an aqueous medium, 0.15 g of sodium dioctyl sulfosuccinate as an anionic surfactant, 0.3 g of sodium polyoxyethylene nonylphenyl ether phosphate as an anionic surfactant, 0.3 g of polyoxyethylene styrenated phenyl ether as a nonionic surfactant, and 0.01 g of sodium nitrite as a polymerization inhibitor were added to the obtained monomer mixture. The mixture was then stirred at 8000 rpm for 10 minutes with a T.K. HOMO MIXER (produced by PRIMIX Corporation) to obtain a monomer mixture.

6.9 g of slurry A obtained in Seed Particle Synthesis Example 1 was added to the monomer mixture with stirring, and stirring was performed at 30° C. for 3 hours to absorb the monomer mixture into the seed particles. Thereafter, while stirring, the internal temperature of the polymerization vessel was raised to 55° C. and kept at 55° C. for 3 hours to carry out seed polymerization for 3 hours. The internal temperature of the polymerization vessel was then raised to 80° C. and kept at 80° C. for 3 hours to further carry out seed polymerization for 3 hours, thereby obtaining a slurry containing polymer particles (an aqueous dispersion containing polymer particles of the first polymerizable vinylic monomer and the aqueous medium).

The slurry containing polymer particles was passed through a 400-mesh nylon screen to classify the polymer particles, thereby obtaining a slurry containing the classified polymer particles.

The slurry containing the classified polymer particles was spray-dried under the following conditions using a spray-drying apparatus (produced by Sakamoto Giken; machine name: spray dryer; type: atomizer take-up system; model number: TRS-3WK) to obtain an aggregate of vinyl-based resin particles.

Apparatus Conditions

Supply rate of slurry containing polymer particles: 25 ml/min

Atomizer rotation rate: 12000 rpm

Air flow: 2 m$^3$/min

Inlet temperature (temperature at a slurry inlet that is provided in the spray dryer, and through which a slurry containing polymer particles is sprayed and introduced): 150° C.

Outlet temperature (temperature at a powder outlet that is provided in the spray dryer, and through which an aggregate of vinyl-based resin particles is discharged): 70° C.

The obtained aggregate of vinyl-based resin particles was crushed using a Current Jet Mill (produced by Nisshin Engineering Inc.; trade name: CJ-10; grinding air pressure: 0.5 MPa) to obtain vinyl-based resin particles ("vinyl-based resin particles A" below).

FIG. 1 shows an SEM photograph of vinyl-based resin particles A obtained by crushing the aggregate of vinyl-based resin particles. As shown in FIG. 1, vinyl-based resin particles A were spherical, and had a homogenous particle size distribution.

The number average particle diameter of vinyl-based resin particles A was 0.83 μm, and the coefficient of variation of the number average particle diameter was 13.9%. The proportion of vinyl-based resin particles A having a particle diameter that was 2 to 10 times the median diameter D50 on a number basis with respect to the total number was 0%.

The pH of an aqueous dispersion of vinyl-based resin particles A measured with a handheld pH meter (D-51S; produced by Horiba, Ltd.) was 5.4.

The 10% thermal decomposition temperature when vinyl-based resin particles A were heated to 500° C. at a rate of 10° C./min in an air atmosphere was 257° C. When vinyl-based resin particles A were heated at 350° C. for 5 hours after being heated at a rate of 10° C./min in an air atmosphere, the mass loss percentage was 97%.

Example 2

Production Example of Vinyl-Based Resin Particles B

A slurry containing polymer particles was obtained by performing seed polymerization under the same conditions as in Example 1, except that as shown in Table 1, 20.3 g of n-butyl acrylate, 0.3 g of 2-ethylhexyl acrylate, and 0.3 g of methyl acrylate were used as monofunctional (meth)acrylic monomers (first polymerizable vinylic monomers); 8.6 g of ethylene glycol dimethacrylate was used as a polyfunctional (meth)acrylic monomer (first polymerizable vinylic monomer); and 0.3 g of pentaerythritol tetrakisthioglycolate (PETG) was used as an antioxidant.

The slurry containing polymer particles was passed through a 400-mesh nylon screen to classify the polymer particles, thereby obtaining a slurry containing the classified polymer particles.

Thereafter, the slurry containing the classified polymer particles was subjected to classification, spray-drying, and crushing under the same conditions as in Example 1, thereby obtaining vinyl-based resin particles ("vinyl-based resin particles B" below).

The number average particle diameter of vinyl-based resin particles B was 0.82 μm, and the coefficient of variation of the number average particle diameter was 13.1%. The proportion of vinyl-based resin particles B having a particle diameter that was 2 to 10 times the median diameter D50 on a number basis with respect to the total number was 1%.

The pH of an aqueous dispersion of vinyl-based resin particles B measured with the handheld pH meter was 5.6.

The 10% thermal decomposition temperature when vinyl-based resin particles B were heated to 500° C. at a rate of 10° C./min in an air atmosphere was 291° C. When vinyl-based resin particles B were heated at 350° C. for 5 hours after being heated at a rate of 10° C./min in an air atmosphere, the mass loss percentage was 95%.

Example 3

Production Example of Vinyl-Based Resin Particles C

A slurry containing polymer particles was obtained by performing seed polymerization under the same conditions as in Example 1, except that as shown in Table 1, 16.4 g of methyl methacrylate as monofunctional (meth)acrylic monomer (first polymerizable vinylic monomer), 0.3 g of styrene as a monofunctional styrenic monomer (first polymerizable vinylic monomer), and 8.6 g of ethylene glycol dimethacrylate as a polyfunctional (meth)acrylic monomer (first polymerizable vinylic monomer) were used.

The slurry containing polymer particles was passed through a 400-mesh nylon screen to classify the polymer particles, thereby obtaining a slurry containing the classified polymer particles.

Thereafter, the slurry containing the classified polymer particles was subjected to classification, spray-drying, and crushing under the same conditions as in Example 1, thereby obtaining vinyl-based resin particles ("vinyl-based resin particles C" below).

The number average particle diameter of vinyl-based resin particles C was 0.83 μm, and the coefficient of variation of the number average particle diameter was 13.4%. The proportion of vinyl-based resin particles C having a particle diameter that was 2 to 10 times the median diameter D50 on a number basis with respect to the total number was 0%.

The pH of an aqueous dispersion of vinyl-based resin particles C measured with the handheld pH meter was 4.7.

The 10% thermal decomposition temperature when vinyl-based resin particles C were heated to 500° C. at a rate of 10° C./min in an air atmosphere was 288° C. When vinyl-based resin particles C were heated at 350° C. for 5 hours after being heated at a rate of 10° C./min in an air atmosphere, the mass loss percentage was 92%.

Example 4

Production Example of Vinyl-Based Resin Particles D

A slurry containing polymer particles was obtained by performing seed polymerization under the same conditions as in Example 1, except that as shown in Table 1, 12.9 g of methyl methacrylate as a monofunctional (meth)acrylic monomer (first polymerizable vinylic monomer), 5.5 g of ethylene glycol dimethacrylate as a polyfunctional (meth) acrylic monomer (first polymerizable vinylic monomer), 0.09 g of 2,2-azobis-(2,4-dimethylvaleronitrile), 73.5 g of ion-exchanged water, and 8.1 g slurry B obtained in Seed Particle Synthesis Example 2 were used.

The slurry containing polymer particles was passed through a 400-mesh nylon screen to classify the polymer particles, thereby obtaining a slurry containing the classified polymer particles.

Thereafter, the slurry containing the classified polymer particles was subjected to classification, spray-drying, and crushing under the same conditions as in Example 1, thereby obtaining vinyl-based resin particles ("vinyl-based resin particles D" below).

The number average particle diameter of vinyl-based resin particles D was 0.38 μm, and the coefficient of variation of the number average particle diameter was 14%. The proportion of vinyl-based resin particles D having a particle diameter that was 2 to 10 times the median diameter D50 on a number basis with respect to the total number was 0%.

The pH of an aqueous dispersion of vinyl-based resin particles D measured with the handheld pH meter was 6.2.

The 10% thermal decomposition temperature when vinyl-based resin particles D were heated to 500° C. at a rate of 10° C./min in an air atmosphere was 283° C. When vinyl-based resin particles D were heated at 350° C. for 5 hours after being heated at a rate of 10° C./min in an air atmosphere, the mass loss percentage was 96%.

Example 5

Production Example of Vinyl-Based Resin Particles E

A slurry containing polymer particles was obtained by performing seed polymerization under the same conditions as in Example 1, except that as shown in Table 1, 14.9 g of isobutyl methacrylate as a monofunctional (meth)acrylic monomer (first polymerizable vinylic monomer) and 14.9 g of ethylene glycol dimethacrylate as a polyfunctional (meth)acrylic monomer (first polymerizable vinylic monomer) were used.

The slurry containing polymer particles was passed through a 400-mesh nylon screen to classify the polymer particles, thereby obtaining a slurry containing the classified polymer particles.

Thereafter, the slurry containing the classified polymer particles was subjected to classification, spray-drying, and crushing under the same conditions as in Example 1, thereby obtaining vinyl-based resin particles ("vinyl-based resin particles E" below).

The number average particle diameter of vinyl-based resin particles E was 0.82 μm, and the coefficient of variation of the number average particle diameter was 13.8%. The proportion of vinyl-based resin particles E having a particle diameter that was 2 to 10 times the median diameter D50 on a number basis with respect to the total number was 0%.

The pH of an aqueous dispersion of vinyl-based resin particles E measured with the handheld pH meter was 5.2.

The 10% thermal decomposition temperature when vinyl-based resin particles E were heated to 500° C. at a rate of 10° C./min in an air atmosphere was 249° C. When vinyl-based resin particles E were heated at 350° C. for 5 hours after being heated at a rate of 10° C./min in an air atmosphere, the mass loss percentage was 98%.

Example 6

Production Example of Vinyl-Based Resin Particles F

In a polymerization vessel equipped with a stirrer, a thermometer, and a nitrogen gas inlet tube, 80 g of ion-exchanged water as an aqueous medium and 0.1 g of ammonium persulfate as a polymerization initiator were mixed to obtain a mixture. In the polymerization vessel, 14 g of methyl methacrylate as a monofunctional (meth)acrylic monomer (second polymerizable vinylic monomer) and 6 g of allyl methacrylate as a polyfunctional (meth)acrylic monomer (second polymerizable vinylic monomer) were added to the obtained mixture. The mixture was then heated to 70° C. with stirring, while bubbling nitrogen gas was introduced from the inlet tube. Thereafter, stirring was continued, and soap-free emulsion polymerization was performed at an internal temperature of 70° C. for 12 hours to obtain a slurry containing polymer particles (an aqueous dispersion containing polymer particles of the second polymerizable vinylic monomer and the aqueous medium). The pH of the obtained slurry containing polymer particles measured with a handheld meter (D-51S: produced by Horiba, Ltd.) was 2.

Thereafter, 0.1 g of a 28 mass % aqueous ammonia solution was added per 100 g of the slurry containing polymer particles, and the mixture was stirred at 20° C. for 10 minutes to introduce amine into the surface of the polymer particles. The pH of the slurry measured after stirring was 7.9.

The slurry after being measured for pH was passed through a 400-mesh nylon screen to classify the polymer particles, thereby obtaining a slurry containing classified polymer particles.

The slurry containing the classified polymer particles was spray-dried under the following conditions using a spray-drying apparatus (produced by Sakamoto Giken; machine name: spray dryer; type: atomizer take-up system; model number: TRS-3WK) to obtain an aggregate of vinyl-based resin particles.

Apparatus Conditions

Supply rate of slurry containing polymer particles: 25 ml/min

Atomizer rotation rate: 9000 rpm

Air flow: 2 m³/min

Inlet temperature (temperature at a slurry inlet that is provided in the spray dryer, and through which a slurry containing polymer particles is sprayed and introduced): 130° C.

Outlet temperature (temperature at a powder outlet that is provided in the spray dryer, and through which an aggregate of vinyl-based resin particles is discharged): 60° C.

The obtained aggregate of vinyl-based resin particles was crushed using a Current Jet Mill (produced by Nisshin Engineering Inc.; trade name: CJ-10; grinding air pressure: 0.5 MPa) to obtain vinyl-based resin particles ("vinyl-based resin particles F" below).

The number average particle diameter of vinyl-based resin particles F was 0.32 μm, and the coefficient of variation of the number average particle diameter was 13.2%. The proportion of the particles having a particle diameter that was 2 to 10 times the median diameter D50 on a number basis with respect to the total number was 0%.

The pH of an aqueous dispersion of vinyl-based resin particles F measured with a handheld pH meter was 7.1.

The 10% thermal decomposition temperature when vinyl-based resin particles F were heated to 500° C. at a rate of 10° C./min in an air atmosphere was 287° C. When vinyl-based resin particles F were heated at 350° C. for 5 hours after being heated at a rate of 10° C./min in an air atmosphere, the mass loss percentage was 95%.

Comparative Example 1

Production Example of Vinyl-Based Resin Particles G

A slurry containing polymer particles was obtained by performing seed polymerization under the same conditions as in Example 1, except that as shown in Table 1, 29.6 g of styrene as a monofunctional styrenic monomer (first polymerizable vinylic monomer) and 0.2 g of ethylene glycol dimethacrylate as a polyfunctional (meth)acrylic monomer (first polymerizable vinylic monomer) were used.

The slurry containing polymer particles was passed through a 400-mesh nylon screen to classify the polymer particles, thereby obtaining a slurry containing the classified polymer particles.

The slurry containing the classified polymer particles were then subjected to classification, spray-drying, and crushing under the same conditions as in Example 1, thereby obtaining vinyl-based resin particles ("vinyl-based resin particles G" below).

The number average particle diameter of vinyl-based resin particles G was 0.82 μm, and the coefficient of variation of the number average particle diameter was 13.6%. The proportion of vinyl-based resin particles G having a particle diameter that was 2 to 10 times the median diameter D50 on a number basis with respect to the total number was 0%.

The pH of an aqueous dispersion of vinyl-based resin particles G measured with the handheld pH meter was 4.2.

The 10% thermal decomposition temperature when vinyl-based resin particles G were heated to 500° C. at a rate of 10° C./min in an air atmosphere was 313° C. When vinyl-based resin particles G were heated at 350° C. for 5 hours after being heated at a rate of 10° C./min in an air atmosphere, the mass loss percentage was 75%.

Comparative Example 2

Production Example of Vinyl-Based Resin Particles H

A slurry containing polymer particles was obtained by performing seed polymerization under the same conditions as in Example 1, except that as shown in Table 1, 29.6 g of methyl methacrylate as a monofunctional (meth)acrylic monomer (first polymerizable vinylic monomer) and 0.2 g of ethylene glycol dimethacrylate as a polyfunctional (meth)acrylic monomer (first polymerizable vinylic monomer) were used.

The slurry containing polymer particles was passed through a 400-mesh nylon screen to classify the polymer particles, thereby obtaining a slurry containing the classified polymer particles.

The slurry containing the classified polymer particles was then subjected to classification, spray-drying, and crushing under the same conditions as in Example 1, thereby obtaining vinyl-based resin particles ("vinyl-based resin particles H" below).

The number average particle diameter of vinyl-based resin particles H was 0.81 μm, and the coefficient of variation of the number average particle diameter was 14.2%. The proportion of vinyl-based resin particles H having a particle diameter that was 2 to 10 times the median diameter D50 on a number basis with respect to the total number was 0%.

The pH of an aqueous dispersion of vinyl-based resin particles H measured with the handheld pH meter was 5.8.

The 10% thermal decomposition temperature when vinyl-based resin particles H were heated to 500° C. at a rate of 10° C./min in an air atmosphere was 319° C. Moreover, when vinyl-based resin particles H were heated at 350° C. for 5 hours after being heated at a rate of 10° C./min in an air atmosphere, the mass loss percentage was 86%.

Comparative Example 3

Production Example of Vinyl-Based Resin Particles I

A slurry containing polymer particles was obtained by performing seed polymerization under the same conditions as in Example 6, except that as shown in Table 1, 19.8 g of methyl methacrylate as a monofunctional (meth)acrylic monomer (second polymerizable vinylic monomer) and 0.2 g of allyl methacrylate as a polyfunctional (meth)acrylic monomer (second polymerizable vinylic monomer) were used.

The slurry containing polymer particles was passed through a 400-mesh nylon screen to classify the polymer particles, thereby obtaining a slurry containing the classified polymer particles.

Thereafter, the slurry containing the classified polymer particles was subjected to classification, spray-drying, and crushing under the same conditions as in Example 6, thereby obtaining vinyl-based resin particles ("vinyl-based resin particles I" below).

The number average particle diameter of vinyl-based resin particles I was 0.30 μm, and the coefficient of variation of the number average particle diameter was 14.1%. The proportion of vinyl-based resin particles I having a particle diameter that was 2 to 10 times the median diameter D50 on a number basis with respect to the total number was 0%.

The pH of an aqueous dispersion of vinyl-based resin particles I measured with the handheld pH meter was 7.1.

The 10% thermal decomposition temperature when vinyl-based resin particles I were heated to 500° C. at a rate of 10° C./min in an air atmosphere was 308° C. When vinyl-based resin particles I were heated at 350° C. for 5 hours after being heated at a rate of 10° C./min in an air atmosphere, the mass loss percentage was 84%.

Test Example 1

Preparation of Polyimide Precursor Varnish in Which Vinyl-Based Resin Particles A is Dispersed In a beaker, 8 g of vinyl-based resin particles A obtained in Example 1 and 24 g of N-methyl-2-pyrrolidone (NMP) as a first organic solvent were mixed to prepare a dispersion of vinyl-based resin particles A. In another beaker, 3.61 g of an NMP solution (solids concentration: 18±1 mass %, produced by Ube Industries, Ltd., U-varnish A) as a polyimide precursor solution and 1.8 g of NMP as a second organic solvent were mixed, and 6 g of the prepared dispersion of vinyl-based resin particles A was added thereto. Thereafter, the mixture was subjected to defoaming with stirring with a defoaming stirrer (produced by Kurabo Industries Ltd., trade name: Mazerustar KK, model number: 250S) for 15 minutes, thereby obtaining a polyimide precursor varnish in which vinyl-based resin particles A were dispersed ("polyimide precursor varnish A" below).

The viscosity of polyimide precursor varnish A measured with a cone-plate type viscometer (produced by Brookfield, model number: DV2TCP) under the conditions described above was 239 (mPa·s).

Preparation of Blank Solution A

In a beaker, 4.5 g of NMP as a first organic solvent, 3.61 g of an NMP solution (solids concentration: 18±1 mass %, produced by Ube Industries, Ltd., U-varnish A) as a polyimide precursor solution, and 1.8 g of NMP as a second organic solvent were mixed; and the mixture was subjected to defoaming with stirring for 15 minutes with a defoaming stirrer, thereby obtaining blank solution A.

Calculation of Rsp

Polyimide precursor varnish A and blank solution A were sampled in different NMR tubes. Thereafter, the transverse relaxation time $T_2$ (ms) of protons derived from polyimide precursor varnish A was measured three times by the Can-Purcell Meiboom-Gill (CPMG) method with a pulsed NMR particle interface characterization device (Acorn Area, produced by XiGo Nanotools) by using a hydrogen nucleus as a measurement nucleus at a measurement temperature of 20° C. at a resonance frequency of 13 MHz with a 90° pulse width of 5.81 μs to calculate the average value of the measurements. Because the average value was 60.5 (ms), the reciprocal of the average value was taken as Ray. Specifically, Ray was 1/[60.5 (ms)].

In the same manner as above, the transverse relaxation time $T_2$ (ms) of protons derived from blank solution A was measured three times to calculate the average value of the measurements. Because the average value was 1095.2 (ms), the reciprocal of the average value was taken as Rb. Specifically, Rb was 1/[1095.2 (ms)].

Rsp calculated based on the following formula (1) was 17.1.

$$Rsp=(Rav-Rb)/Rb \qquad (1)$$

Evaluation of Porous Polyimide Film

Polyimide precursor varnish A as a porous-film-forming coating solution was applied to a silicone-coated polyethylene terephthalate (PET) film with a coater (IMC-70F0-C, produced by Imoto Machinery Co., Ltd.) and an applicator (Baker Applicator YBA, produced by Yoshimitsu Seiki). The coating film was then dried at 60° C. for 1 hour to remove the first and second organic solvents, thereby obtaining an unfired composite film containing vinyl-based resin particles (film thickness: about 32 μm).

The unfired composite film was peeled off from the PET film, and heated from 20° C. to 320° C. at a rate of 10° C./min in an air atmosphere with a microwave muffle furnace (Phoenix, produced by CEM). Thereafter, the film was heated at 320° C. for 5 hours, thereby forming a polyimide; as a result, a porous polyimide film was obtained.

The major axis and minor axis of the pores of the obtained porous polyimide film were measured with the length measurement tool of an SEM, and the average pore diameter was found to be 0.79 μm.

Additionally, the maximum film thickness and the minimum film thickness of the surface of the obtained porous polyimide film were measured with the length measurement tool of a magnifying microscope. The maximum film thickness was 38 μm, and the minimum film thickness was 26 μm. This indicates that a porous polyimide film with a uniform film thickness was obtained. These results reveal that the surface of the porous polyimide film was smoothed by using the vinyl-based resin particles according to the present invention.

Test Example 2

A polyimide precursor varnish in which vinyl-based resin particles A were dispersed ("polyimide precursor varnish B" below) and a blank solution ("blank solution B" below) were prepared under the same conditions as in Test Example 1, except that γ-butyrolactone (GBL) was used as the first and second organic solvents.

The viscosity of polyimide precursor varnish B measured with a cone-plate type viscometer under the conditions described above was 294 (mPa·s).

Rav of polyimide precursor varnish B and Rb of blank solution B were calculated under the same conditions as in Test Example 1. Rav was 1/[66.3 (ms)], and Rb was 1/[1218.9 (ms)]. Rsp calculated from these values based on formula (1) was 17.4.

A porous polyimide film was produced under the same conditions as in Test Example 1, except that polyimide precursor varnish B was used.

The major axis and minor axis of the pores of the porous polyimide film were measured with the length measurement tool of an SEM, and the average pore diameter was found to be 0.77 μm.

The maximum film thickness and the minimum film thickness of the surface of the porous polyimide film were measured with the length measurement tool of the magnifying microscope. The maximum film thickness was 38 μm, and the minimum film thickness was 28 μm. This indicates that a porous polyimide film with a uniform film thickness was obtained. The surface of the porous polyimide film was smoothed by using the vinyl-based resin particles according to the present invention.

Test Example 3

A polyimide precursor varnish in which vinyl-based resin particles B were dispersed ("polyimide precursor varnish C" below) and a blank solution ("blank solution C" below) were prepared under the same conditions as in Test Example 1, except that vinyl-based resin particles B were used.

The viscosity of polyimide precursor varnish C measured with a cone-plate type viscometer under the conditions described above was 187 (mPa·s).

Rav of polyimide precursor varnish C and Rb of blank solution C were calculated under the same conditions as in Test Example 1. Rav was 1/[38.4 (ms)], and Rb was 1/[1095.2 (ms)]. Rsp calculated from these values based on formula (1) was 27.5.

A porous polyimide film was produced under the same conditions as in Test Example 1, except that polyimide precursor varnish C was used.

The major axis and minor axis of the pores of the porous polyimide film were measured with the length measurement tool of an SEM, and the average pore diameter was found to be 0.69 μm.

The maximum film thickness and the minimum film thickness of the surface of the porous polyimide film were measured with the length measurement tool of a magnifying microscope. The maximum film thickness was 39 μm, and the minimum film thickness was 26 μm. This indicates that a porous polyimide film with a uniform film thickness was obtained. The surface of the porous polyimide film was smoothed by using the vinyl-based resin particles according to the present invention.

Test Example 4

A polyimide precursor varnish in which vinyl-based resin particles B were dispersed ("polyimide precursor varnish D" below) and a blank solution ("blank solution D" below) were prepared under the same conditions as in Test Example 1, except that vinyl-based resin particles B were used, and that N,N-dimethylacetamide (DMAC) was used as the first and second organic solvents.

The viscosity of polyimide precursor varnish D measured with a cone-plate type viscometer under the conditions described above was 149 (mPa·s).

Rav of polyimide precursor varnish D and Rb of blank solution D were calculated under the same conditions as in Test Example 1. Rav was 1/[22.1 (ms)], and Rb was 1/[1359 (ms)]. Rsp calculated from these values based on formula (1) was 60.5.

A porous polyimide film was produced under the same conditions as in Test Example 1, except that polyimide precursor varnish D was used.

The major axis and minor axis of the pores of the porous polyimide film were measured with the length measurement tool of an SEM, and the average pore diameter was found to be 0.71 μm.

The maximum film thickness and the minimum film thickness of the surface of the porous polyimide film were measured with the length measurement tool of a magnifying microscope. The maximum film thickness was 36 μm, and the minimum film thickness was 27 μm. This indicates that a porous polyimide film with a uniform film thickness was obtained. The surface of the porous polyimide film was smoothed by using the vinyl-based resin particles according to the present invention.

Test Example 5

A polyimide precursor varnish in which vinyl-based resin particles C were dispersed ("polyimide precursor varnish E" below) and a blank solution ("blank solution E" below) were prepared under the same conditions as in Test Example 1, except that vinyl-based resin particles C were used.

The viscosity of polyimide precursor varnish E measured with a cone-plate type viscometer under the conditions described above was 211 (mPa·s).

Rav of polyimide precursor varnish E and Rb of blank solution E were calculated under the same conditions as in Test Example 1. Rav was 1/[94.5 (ms)], and Rb was 1/[1095.2 (ms)]. Rsp calculated from these values based on formula (1) was 10.6.

A porous polyimide film was produced under the same conditions as in Test Example 1, except that polyimide precursor varnish E was used.

The major axis and minor axis of the pores of the porous polyimide film were measured with the length measurement tool of an SEM, and the average pore diameter was found to be 0.78 μm.

The maximum film thickness and the minimum film thickness of the surface of the porous polyimide film were measured with the length measurement tool of a magnifying microscope. The maximum film thickness was 35 μm, and the minimum film thickness was 26 μm. This indicates that a porous polyimide film with a uniform film thickness was obtained. The surface of the porous polyimide film was smoothed by using the vinyl-based resin particles according to the present invention.

Test Example 6

A polyimide precursor varnish in which vinyl-based resin particles D were dispersed ("polyimide precursor varnish F" below) and a blank solution ("blank solution F" below) were prepared under the same conditions as in Test Example 1, except that vinyl-based resin particles D were used.

The viscosity of polyimide precursor varnish F measured with a cone-plate type viscometer under the conditions described above was 179 (mPa·s).

Rav of polyimide precursor varnish F and Rb of blank solution F were calculated under the same conditions as in Test Example 1. Rav was 1/[37.5 (ms)], and Rb was 1/[1095.2 (ms)]. Rsp calculated from these values based on formula (1) was 28.2.

A porous polyimide film was produced under the same conditions as in Test Example 1, except that polyimide precursor varnish F was used.

The major axis and minor axis of the pores of the porous polyimide film were measured with the length measurement tool of an SEM, and the average pore diameter was found to be 0.31 μm.

The maximum film thickness and the minimum film thickness of the surface of the porous polyimide film were measured with the length measurement tool of a magnifying microscope. The maximum film thickness was 35 μm, and the minimum film thickness was 27 μm. This indicates that a porous polyimide film with a uniform film thickness was obtained. The surface of the porous polyimide film was smoothed by using the vinyl-based resin particles according to the present invention.

Test Example 7

A polyimide precursor varnish in which vinyl-based resin particles D were dispersed ("polyimide precursor varnish G" below) and a blank solution ("blank solution G" below) were prepared under the same conditions as in Test Example 1, except that vinyl-based resin particles D were used, and that N,N-dimethylacetamide (DMAC) was used as the first and second organic solvents.

The viscosity of polyimide precursor varnish G measured with a cone-plate type viscometer under the conditions described above was 158 (mPa·s).

Rav of polyimide precursor varnish G and Rb of blank solution G were calculated under the same conditions as in Test Example 1. Rav was 1/[22.2 (ms)], and Rb was 1/[1359 (ms)]. Rsp calculated from these values based on formula (1) was 60.2.

A porous polyimide film was produced under the same conditions as in Test Example 1, except that polyimide precursor varnish G was used.

The major axis and minor axis of the pores of the porous polyimide film were measured with the length measurement tool of an SEM, and the average pore diameter was found to be 0.33 μm.

The maximum film thickness and the minimum film thickness of the surface of the porous polyimide film were measured with the length measurement tool of a magnifying microscope. The maximum film thickness was 40 μm, and the minimum film thickness was 28 μm. This indicates that a porous polyimide film with a uniform film thickness was obtained. The surface of the porous polyimide film was smoothed by using the vinyl-based resin particles according to the present invention.

Test Example 8

A polyimide precursor varnish in which vinyl-based resin particles E were dispersed ("polyimide precursor varnish H" below) and a blank solution ("blank solution H" below) were prepared under the same conditions as in Test Example 1, except that vinyl-based resin particles E were used.

The viscosity of polyimide precursor varnish H measured with a cone-plate type viscometer under the conditions described above was 238 (mPa·s).

Rav of polyimide precursor varnish H and Rb of blank solution H were calculated under the same conditions as in Test Example 1. Rav was 1/[60 (ms)], and Rb was 1/[1095.2 (ms)]. Rsp calculated from these values based on formula (1) was 17.3.

A porous polyimide film was produced under the same conditions as in Test Example 1, except that polyimide precursor varnish H was used.

The major axis and minor axis of the pores of the porous polyimide film were measured with the length measurement tool of an SEM, and the average pore diameter was found to be 0.76 μm.

The maximum film thickness and the minimum film thickness of the surface of the porous polyimide film were measured with the length measurement tool of a magnifying microscope. The maximum film thickness was 39 μm, and the minimum film thickness was 27 μm. This indicates that a porous polyimide film with a uniform film thickness was obtained. The surface of the porous polyimide film was smoothed by using the vinyl-based resin particles according to the present invention.

Test Example 9

A polyimide precursor varnish in which vinyl-based resin particles F were dispersed ("polyimide precursor varnish I" below) and a blank solution ("blank solution I" below) were prepared under the same conditions as in Test Example 1, except that vinyl-based resin particles F were used.

The viscosity of polyimide precursor varnish I measured with a cone-plate type viscometer under the conditions described above was 289 (mPa·s).

Rav of polyimide precursor varnish I and Rb of blank solution I were calculated under the same conditions as in Test Example 1. Rav was 1/[50 (ms)], and Rb was 1/[1095.2 (ms)]. Rsp calculated from these values based on formula (1) was 20.9.

A porous polyimide film was produced under the same conditions as in Test Example 1, except that polyimide precursor varnish I was used.

The major axis and minor axis of the pores of the porous polyimide film were measured with the length measurement tool of an SEM, and the average pore diameter was found to be 0.29 μm.

The maximum film thickness and the minimum film thickness of the surface of the porous polyimide film were measured with the length measurement tool of a magnifying microscope. The maximum film thickness was 40 μm, and the minimum film thickness was 27 μm. This indicates that a porous polyimide film with a uniform film thickness was obtained. The surface of the porous polyimide film was smoothed by using the vinyl-based resin particles according to the present invention.

Test Example 10

A polyimide precursor varnish in which vinyl-based resin particles G were dispersed ("polyimide precursor varnish J" below) and a blank solution ("blank solution J" below) were prepared under the same conditions as in Test Example 1, except that vinyl-based resin particles G were used.

The viscosity of polyimide precursor varnish J measured with a cone-plate type viscometer under the conditions described above was 1010 (mPa·s).

Rav of polyimide precursor varnish J and Rb of blank solution J were calculated under the same conditions as in Test Example 1. Rav was 1/[439 (ms)], and Rb was 1/[1095.2 (ms)]. Rsp calculated from these values based on formula (1) was 1.49.

A porous polyimide film was produced under the same conditions as in Test Example 1, except that polyimide precursor varnish J was used.

The major axis and minor axis of the pores of the porous polyimide film were measured with the length measurement tool of an SEM, and the average pore diameter was found to be 1.08 μm.

The maximum film thickness and the minimum film thickness of the surface of the porous polyimide film were measured with the length measurement tool of a magnifying microscope. The maximum film thickness was 89 μm, and the minimum film thickness was 25 μm. This indicates that a porous polyimide film with a uniform film thickness was not obtained.

Test Example 11

A polyimide precursor varnish in which vinyl-based resin particles G were dispersed ("polyimide precursor varnish K" below) and a blank solution ("blank solution K" below) were prepared under the same conditions as in Test Example 1, except that vinyl-based resin particles G were used, and that γ-butyrolactone (GBL) was used as the first and second organic solvents.

The viscosity of polyimide precursor varnish K measured with a cone-plate type viscometer under the conditions described above was 1045 (mPa·s).

Rav of polyimide precursor varnish K and Rb of blank solution K were calculated under the same conditions as in Test Example 1. Rav was 1/[434 (ms)], and Rb was 1/[1218.9 (ms)]. Rsp calculated from these values based on formula (1) was 1.81.

A porous polyimide film was produced under the same conditions as in Test Example 1, except that polyimide precursor varnish K was used.

The major axis and minor axis of the pores of the porous polyimide film were measured with the length measurement tool of an SEM, and the average pore diameter was found to be 1.09 μm.

The maximum film thickness and the minimum film thickness of the surface of the porous polyimide film were measured with the length measurement tool of a magnifying microscope. The maximum film thickness was 92 μm, and the minimum film thickness was 26 μm. This indicates that a porous polyimide film with a uniform film thickness was not obtained.

Test Example 12

A polyimide precursor varnish in which vinyl-based resin particles G were dispersed ("polyimide precursor varnish L" below) and a blank solution ("blank solution L" below) were prepared under the same conditions as in Test Example 1, except that vinyl-based resin particles H were used.

The viscosity of polyimide precursor varnish L measured with a cone-plate type viscometer under the conditions described above was 1060 (mPa·s).

Rav of polyimide precursor varnish L and Rb of blank solution L were calculated under the same conditions as in Test Example 1. Rav was 1/[350 (ms)], and Rb was 1/[1095.2 (ms)]. Rsp calculated from these values based on formula (1) was 2.13.

A porous polyimide film was produced under the same conditions as in Test Example 1, except that polyimide precursor varnish L was used.

The major axis and minor axis of the pores of the porous polyimide film were measured with the length measurement tool of an SEM, and the average pore diameter was found to be 1.07 μm.

The maximum film thickness and the minimum film thickness of the surface of the porous polyimide film were measured with the length measurement tool of a magnifying microscope. The maximum film thickness was 92 μm, and the minimum film thickness was 28 μm. This indicates that a porous polyimide film with a uniform film thickness was not obtained.

Test Example 13

A polyimide precursor varnish in which vinyl-based resin particles I were dispersed ("polyimide precursor varnish M" below) and a blank solution ("blank solution M" below) were prepared under the same conditions as in Test Example 1, except that vinyl-based resin particles I were used.

The viscosity of polyimide precursor varnish M measured with a cone-plate type viscometer under the conditions described above was 1097 (mPa·s).

Rav of polyimide precursor varnish M and Rb of blank solution M were calculated under the same conditions as in Test Example 1. Rav was 1/[340 (ms)], and Rb was 1/[1095.2 (ms)]. Rsp calculated from these values based on formula (1) was 2.22.

A porous polyimide film was produced under the same conditions as in Test Example 1, except that polyimide precursor varnish M was used.

The major axis and minor axis of the pores of the porous polyimide film were measured with the length measurement tool of an SEM, and the average pore diameter was found to be 0.39 μm.

The maximum film thickness and the minimum film thickness of the surface of the porous polyimide film were measured with the length measurement tool of a magnifying microscope. The maximum film thickness was 111 μm, and the minimum film thickness was 27 μm. This indicates that a porous polyimide film with a uniform film thickness was not obtained.

Evaluation Results

Tables 1 and 2 show the evaluation results of the Examples, Comparative Examples, and Test Examples. In Tables 1 and 2, particles A to particles I respectively refer to vinyl-based resin particles A to vinyl-based resin particles I. In Table 1, the proportion (%) of coarse particles refers to the proportion (%) of the number of particles in the particle diameter range that is 2 to 10 times the median diameter D50 on a number basis with respect to the total number of vinyl-based resin particles.

TABLE 1

| | | Example 1 Particles A | Example 2 Particles B | Example 3 Particles C | Example 4 Particles D | Example 5 Particles E |
|---|---|---|---|---|---|---|
| Mono functional Monomer (g) | Methyl Methacrylate | — | — | 16.4 | 12.9 | — |
| | Isobutyl Methacrylate | 20.9 | — | — | — | 14.9 |
| | Styrene | — | — | 4.8 | — | — |
| | n-Butyl Acrylate | — | 20.3 | — | — | — |
| | 2-Ethylhexyl Acrylate | — | 0.3 | — | — | — |
| | Methyl Acrylate | — | 0.3 | — | — | — |
| Polyfunctional Monomer (g) | Ethylene Glycol Dimethacrylate | 8.9 | 8.6 | 8.6 | 5.5 | 14.9 |
| | Allyl Methacrylate | — | — | — | — | — |
| Antioxidant (g) | Pentaerythritol Tetrakisthioglycolate | — | 0.3 | — | — | — |
| Type of Slurry (A or B)/Amount of Slurry for Use (g) | | A/6.9 | A/6.9 | A/6.9 | B/8.1 | A/6.9 |
| Ion-Exchanged Water (g) | | 63.3 | 63.3 | 63.3 | 73.5 | 63.3 |
| Polymerization Initiator (g) | Ammonium Persulfate | — | — | — | — | — |
| | 2,2-Azobis-(2,4-Dimethylvaleronitrile) | 0.15 | 0.15 | 0.15 | 0.09 | 0.15 |
| Number Average Particle Diameter of Vinyl-Based Resin Particles (μm) | | 0.83 | 0.82 | 0.83 | 0.38 | 0.82 |
| Coefficient of Variation of Number Average Particle Diameter of Vinyl-Based Resin Particles (%) | | 13.9 | 13.1 | 13.4 | 14 | 13.8 |
| Proportion of Coarse Particles (%) | | 0 | 1 | 0 | 0 | 0 |
| Temperature at 10% Mass Loss (10% Thermal Decomposition Temperature) (%) | | 257 | 291 | 288 | 283 | 249 |
| pH of Vinyl-Based Resin Particles | | 5.4 | 5.6 | 4.7 | 6.2 | 5.2 |
| Mass Loss Percentage (%) After Heating at 350° C. for 5 Hours | | 97 | 95 | 92 | 96 | 98 |

| | | Example 6 Particles F | Comparative Example 1 Particles G | Comparative Example 2 Particles H | Comparative Example 3 Particles I |
|---|---|---|---|---|---|
| Mono functional Monomer (g) | Methyl Methacrylate | 14 | — | 29.6 | 19.8 |
| | Isobutyl Methacrylate | — | — | — | — |
| | Styrene | — | 29.6 | — | — |
| | n-Butyl Acrylate | — | — | — | — |
| | 2-Ethylhexyl Acrylate | — | — | — | — |
| | Methyl Acrylate | — | — | — | — |
| Polyfunctional Monomer (g) | Ethylene Glycol Dimethacrylate | — | 0.2 | 0.2 | — |
| | Allyl Methacrylate | 6 | — | — | 0.2 |
| Antioxidant (g) | Pentaerythritol Tetrakisthioglycolate | — | — | — | — |
| Type of Slurry (A or B)/Amount of Slurry for Use (g) | | — | A/6.9 | A/6.9 | — |
| Ion-Exchanged Water (g) | | 80 | 63.3 | 63.3 | 80 |
| Polymerization | Ammonium Persulfate | 0.1 | — | — | 0.1 |

TABLE 1-continued

| | | | | | |
|---|---|---|---|---|---|
| Initiator (g) | 2,2-Azobis-(2,4-Dimethylvaleronitrile) | — | 0.15 | 0.15 | — |
| Number Average Particle Diameter of Vinyl-Based Resin Particles (μm) | | 0.32 | 0.82 | 0.81 | 0.30 |
| Coefficient of Variation of Number Average Particle Diameter of Vinyl-Based Resin Particles (%) | | 13.2 | 13.6 | 14.2 | 14.1 |
| Proportion of Coarse Particles (%) | | 0 | 0 | 0 | 0 |
| Temperature at 10% Mass Loss (10% Thermal Decomposition Temperature) (%) | | 287 | 313 | 319 | 308 |
| pH of Vinyl-Based Resin Particles | | 7.1 | 4.2 | 5.8 | 7.1 |
| Mass Loss Percentage (%) After Heating at 350° C. for 5 Hours | | 95 | 75 | 86 | 84 |

TABLE 2

| | Vinyl-Based Resin Particles for Use | First and Second Organic Solvents | Rsp | Viscosity of Polyimide Vanish (mPa · s) |
|---|---|---|---|---|
| Test Example 1 | Particles A | NMP | 17.1 | 239 |
| Test Example 2 | Particles A | GBL | 17.4 | 294 |
| Test Example 3 | Particles B | NMP | 27.5 | 187 |
| Test Example 4 | Particles B | DMAC | 60.5 | 149 |
| Test Example 5 | Particles C | NMP | 10.6 | 211 |
| Test Example 6 | Particles D | NMP | 28.2 | 179 |
| Test Example 7 | Particles D | DMAC | 60.2 | 158 |
| Test Example 8 | Particles E | NMP | 17.3 | 238 |
| Test Example 9 | Particles F | NMP | 20.9 | 289 |
| Test Example 10 | Particles G | NMP | 1.49 | 1010 |
| Test Example 11 | Particles G | GBL | 1.81 | 1045 |
| Test Example 12 | Particles H | NMP | 2.13 | 1060 |
| Test Example 13 | Particles I | NMP | 2.22 | 1097 |

The invention claimed is:

1. Vinyl-based resin particles for use in making a thermosetting resin porous,
the particles having a temperature of 230° C. or higher and lower than 300° C. at 10% mass loss when heated at a rate of 10° C./min in an air atmosphere, and
the particles having a mass loss percentage of 85 to 100% after being heated at 350° C. for 5 hours in an air atmosphere.

2. The vinyl-based resin particles according to claim 1, wherein the vinyl-based resin particles have a number average particle diameter in the range of 0.1 to 3 μm.

3. The vinyl-based resin particles according to claim 2, wherein the coefficient of variation of the number average particle diameter is 25% or less.

4. The vinyl-based resin particles according to claim 1, wherein the proportion of the number of particles having a particle diameter that is 2 to 10 times the median diameter (D50) on a number basis is in the range of 0 to 5%.

5. The vinyl-based resin particles according to claim 1, wherein the vinyl-based resin particles are formed of a polymer having a polymerizable vinylic monomer unit composed of a monofunctional monomer unit and a polyfunctional monomer unit, and the polymerizable vinylic monomer unit comprises the polyfunctional monomer unit in an amount of 8 to 150 parts by mass based on 100 parts by mass of the monofunctional monomer unit.

6. The vinyl-based resin particles according to claim 5, wherein the monofunctional monomer unit is at least one member selected from the group consisting of a monofunctional styrenic monomer unit and a monofunctional (meth)acrylic monomer unit, and the polyfunctional monomer unit is at least one member selected from the group consisting of a polyfunctional styrenic monomer unit and a polyfunctional (meth)acrylic monomer unit.

7. The vinyl-based resin particles according to claim 6, wherein the monofunctional (meth)acrylic monomer unit is a (meth)acrylic acid alkyl ester monomer unit, and an alkyl group having 1 to 10 carbon atoms is bonded to the ester.

8. The vinyl-based resin particles according to claim 1, wherein a pH of 3 to 9 is obtained when the vinyl-based resin particles are dispersed in water so that the mass ratio of the vinyl-based resin particles to water is 1:10.

9. The vinyl-based resin particles according to claim 1, which have an Rsp value of 5 or more and 150 or less, wherein the Rsp value is represented by the following formula (1):

$$Rsp=(Rav-Rb)/Rb \ldots \quad (1)$$

Rav: Reciprocal of average value of transverse relaxation time $T_2$ (ms) obtained by the following measurement method 1
Rb: Reciprocal of transverse relaxation time $T_2$ (ms) obtained by the following measurement method 2
Measurement method 1
A vinyl-based resin particle dispersion is obtained by mixing the vinyl-based resin particles and a first organic solvent in a mass ratio of 1:3, a polyimide precursor varnish is obtained by mixing the vinyl-based resin particle dispersion, a polyimide precursor solution with a solid concentration of 18±1 mass %, and a second organic solvent in a mass ratio of 6:3.61:1.8, the transverse relaxation time $T_2$ (ms) of protons derived from the varnish is measured three times by the CPMG method using a hydrogen nucleus as a measurement nucleus at a measurement temperature of 20° C. at a resonance frequency of 13 MHz with a 90° pulse width of 5.81 μs to calculate an average value thereof, and the reciprocal of the average value is taken as Rav, Measurement method 2

A blank solution is obtained by mixing the first organic solvent, a polyimide precursor solution with a solid concentration of 18±1 mass %, and the second organic solvent in a mass ratio of 4.5:3.61:1.8, the transverse relaxation time $T_2$ (ms) of protons derived from the blank solution is measured three times by the CPMG method using a hydrogen nucleus as a measurement nucleus at a measurement temperature of 20° C. at a resonance frequency of 13 MHz with a 90° pulse width of 5.81 µs to calculate an average value thereof, and the reciprocal of the average value is taken as Rb.

10. A method for producing the vinyl-based resin particles according to claim 1, the method comprising:
- a seed polymerization step of performing seed polymerization by absorbing a first polymerizable vinylic monomer into seed particles to obtain an aqueous dispersion containing polymer particles of the first polymerizable vinylic monomer and an aqueous medium;
- a spray-drying step of spray-drying the aqueous dispersion obtained in the seed polymerization step at an inlet temperature of 80 to 220° C. and an outlet temperature of 50 to 100° C. to obtain an aggregate; and
- a crushing step of crushing the aggregate obtained in the spray-drying step to obtain vinyl-based resin particles,
- wherein in the seed polymerization step, the first polymerizable vinylic monomer comprises a monofunctional monomer and a polyfunctional monomer, and the first polymerizable vinylic monomer comprises the polyfunctional monomer in an amount of 8 to 150 parts by mass based on 100 parts by mass of the monofunctional monomer.

11. The method for producing the vinyl-based resin particles according to claim 10, comprising at least one of a first classification step of classifying the polymer particles obtained in the seed polymerization step and a second classification step of classifying the vinyl-based resin particles obtained in the crushing step.

12. A method for producing the vinyl-based resin particles according to claim 1, the method comprising:
- an emulsion polymerization step of emulsion-polymerizing a second polymerizable vinylic monomer in an aqueous medium to obtain an aqueous dispersion containing polymer particles of the second polymerizable vinylic monomer and the aqueous medium;
- a spray-drying step of spray-drying the aqueous dispersion obtained in the emulsion polymerization step at an inlet temperature of 80 to 220° C. and an outlet temperature of 50 to 100° C. to obtain an aggregate; and
- a crushing step of crushing the aggregate obtained in the spray-drying step to obtain vinyl-based resin particles.

13. The method for producing the vinyl-based resin particles according to claim 12, comprising a pH adjustment step of adding a nitrogen-containing compound to the aqueous dispersion obtained in the emulsion polymerization step to adjust the pH of the aqueous dispersion to 3 to 9.

14. The method for producing the vinyl-based resin particles according to claim 12, comprising at least one of a first classification step of classifying the polymer particles obtained in the emulsion polymerization step and a second classification step of classifying the vinyl-based resin particles obtained in the crushing step.

* * * * *